(12) United States Patent
Choi et al.

(10) Patent No.: US 10,652,998 B2
(45) Date of Patent: May 12, 2020

(54) MULTILAYER CERAMIC ELECTRONIC PACKAGE WITH MODULATED MESH TOPOLOGY

(71) Applicant: International Business Machines Corporation, Armonk, NY (US)

(72) Inventors: Jinwoo Choi, Austin, TX (US); Daniel M. Dreps, Georgetown, TX (US); Yanyan Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/137,624

(22) Filed: Sep. 21, 2018

(65) Prior Publication Data
US 2020/0100355 A1 Mar. 26, 2020

(51) Int. Cl.
*H05K 1/02* (2006.01)
*H01L 23/538* (2006.01)
(Continued)

(52) U.S. Cl.
CPC ....... *H05K 1/0224* (2013.01); *G06F 17/5081* (2013.01); *H01L 23/49894* (2013.01);
(Continued)

(58) Field of Classification Search
CPC ... H01L 25/18; H01L 23/49894; H01L 23/66; H01L 2224/16235; H01L 2224/81815; H01L 24/81; H01L 2223/6616; H01L 23/5383; H01L 23/5386; H01L 23/49822; H01L 23/5389; H05K 2201/09981; H05K 1/181; H05K 2201/10674; H05K 1/0224; H05K 2201/10378; H05K 2201/10734;
(Continued)

(56) References Cited

U.S. PATENT DOCUMENTS 6,441,470 B1 8/2002 Shenoy
6,534,852 B1 * 3/2003 Lin ..................... H01L 23/3128
257/690

(Continued)

OTHER PUBLICATIONS

Tummala, R., "Fundamentals of Microsystems Packaging", McGraw-Hill, 2001, Abstract Only, 7 pages.
(Continued)

*Primary Examiner* — Jasmine J Clark
(74) *Attorney, Agent, or Firm* — Nathan M. Rau

(57) ABSTRACT

An electronic package can include modulated mesh planes for reducing crosstalk between adjacent signal wires within the electronic package. Modulated mesh planes above and below a wiring plane can include sets of adjacent wires arranged in an orientation parallel to signal wires within the wiring plane, and sets of adjacent wires arranged in an orientation perpendicular to the signal wires. The sets of wires in each of the mesh planes are each electrically interconnected and insulated by a dielectric layer from the signal wires. The electronic package also includes a region of the mesh planes having the adjacent wires that are arranged in an orientation perpendicular to the signal wires separated by a first distance, and another region of the mesh planes having adjacent wires perpendicular to the signal wires separated by a distance greater than the first distance.

20 Claims, 16 Drawing Sheets

(51) Int. Cl.
*H01L 23/66* (2006.01)
*H01L 25/18* (2006.01)
*G06F 17/50* (2006.01)
*H01L 23/498* (2006.01)
*H05K 1/18* (2006.01)
*H01L 23/00* (2006.01)

(52) U.S. Cl.
CPC ...... *H01L 23/5383* (2013.01); *H01L 23/5386* (2013.01); *H01L 23/66* (2013.01); *H01L 25/18* (2013.01); *H05K 1/181* (2013.01); *G06F 2217/82* (2013.01); *H01L 24/16* (2013.01); *H01L 24/81* (2013.01); *H01L 2223/6616* (2013.01); *H01L 2224/16227* (2013.01); *H01L 2224/81815* (2013.01); *H05K 2201/09681* (2013.01); *H05K 2201/10378* (2013.01); *H05K 2201/10734* (2013.01)

(58) Field of Classification Search
CPC ...... H05K 2201/09681; G06F 2217/82; G06F 17/5081
See application file for complete search history.

(56) References Cited

U.S. PATENT DOCUMENTS

| | | | |
|---|---|---|---|
| 6,734,472 B2 | 5/2004 | Ho | |
| 7,348,667 B2 | 3/2008 | Chun et al. | |
| 7,430,800 B2 | 10/2008 | Haridass et al. | |
| 7,462,912 B2 | 12/2008 | Ahn et al. | |
| 8,288,657 B2 | 10/2012 | Choi et al. | |
| 8,791,371 B2 | 7/2014 | Choi | |
| 8,791,550 B1 | 7/2014 | Gu et al. | |
| 8,927,879 B2 * | 1/2015 | Choi | H05K 1/0224 174/262 |
| 9,232,645 B2 | 1/2016 | Choi et al. | |
| 2015/0170996 A1 | 6/2015 | Altabella Lazzi et al. | |

OTHER PUBLICATIONS

Choi et al., "Crosstalk Analysis between Interconnects in High-Speed Server Packages", 2007 Electronic Components and Technology Conference, May 29-Jun. 1, 2007, pp. 333-338.

Choi et al., "Methodology for Minimizing Far-End Noise Coupling between Interconnects in High-Speed Ceramic Modules", 2009 Electronic Components and Technology Conference, May 26-29, 2009, pp. 1227-1233.

Mandrekar et al., "Channel Optimization for the Design of High Speed I/O links", 2010 23rd International Conference on VLSI Design, Jan. 3-7, 2010, pp. 87-92.

Krauter et al., "Parallelized Full Package Signal Integrity Analysis Using Spatially Distributed 3D Circuit Models", 2006 IEEE Electrical Performance of Electronic Packaging, Oct. 23-25, 2006, pp. 303-306.

Choi et al., "Effects of Mesh Planes on Signal Integrity in Glass Ceramic Packages for High-Performance Servers", Proceedings of the Korean Institute of Electromagnetic Engineering and Science, vol. 24, No. 2, pp. 35-50, Mar. 2013.

Choi et al., "Multilayer Ceramic Electronic Package With Modulated Mesh Topology and Alternating Rods", U.S. Appl. No. 16/137,633, filed Sep. 21, 2018.

IBM, List of IBM Patents or Patent Applications Treated as Related, Sep. 20, 2018, 2 pages.

* cited by examiner

1000
Multilayer Ceramic (MLC) Package with Modulated Mesh Plane Structure Having Alternating Length Rods (Cross-Sectional View)

US 10,652,998 B2

MULTILAYER CERAMIC ELECTRONIC PACKAGE WITH MODULATED MESH TOPOLOGY

BACKGROUND

The present disclosure generally relates to integrated circuit (IC) packaging components such as multilayer ceramic (MLC) chip packages. In particular, this disclosure relates to modulated mesh structures used to reduce signal crosstalk within a multilayer IC package.

ICs can be assembled into protective packages which can allow easy handling and assembly onto printed circuit (PC) boards and which can also protect the ICs from external damage. IC packages include a large variety of different sizes, types, and physical/electrical configurations. IC package material types can include organic materials, e.g., plastics, and non-organic materials such as ceramics. Some IC package types can have standardized dimensions and tolerances, and can be registered with trade industry associations such as the Joint Electron Device Engineering Council (JEDEC). Other IC package types can use proprietary dimension and tolerance designations which may be made by only a small number of manufacturers. IC packaging can be the last assembly process before the testing and shipping of devices to customers.

An IC, also known as a "microchip," silicon or computer "chip," is a specially prepared piece of silicon, or other semiconductor material, into which a complex electronic circuit is etched and formed using a photolithographic process. IC types can include computer processors, memory, analog, and customizable devices. ICs can be relatively fragile, and therefore are often mounted on and/or surrounded by a protective, supportive ceramic or plastic package. Electrical connections to the chip can be provided through metal contacts, which can include pins or solder balls located on the exterior of the chip package.

ICs can have certain advantages over comparable discrete circuits, such as relatively low-cost and high-performance. The cost of an IC can be relatively low, resulting from the large number, e.g., millions, of transistors that can be simultaneously printed as a complete functional unit by photolithographic techniques, rather than constructing an equivalent circuit from individually fabricated transistors. Performance of an IC can be significantly higher than an equivalent discrete circuit, due to the high density and relatively low electrical interconnect parasitics between active devices such as transistors. Types of ICs may include analog, digital and "mixed signal" chips, i.e., chips that incorporate both analog and digital functions on the same silicon die.

SUMMARY

Embodiments may be directed towards an electronic package that includes modulated mesh planes for reducing crosstalk between adjacent signal wires within the electronic package. The electronic package includes a wiring plane located in a coplanar orientation between an upper mesh plane and a lower mesh plane. The wiring plane includes a set of adjacent signal wires, each signal wire of the set of adjacent signal wires extending parallel to a first axis and electrically insulated by a dielectric layer. The upper mesh plane includes a first set of wires, each wire of the first set of wires extending parallel to the first axis. The upper mesh plane also includes a second set of wires. Each wire of the second set of wires extends parallel to a second axis that is orthogonal to the first axis, intersects with and electrically interconnected to the first set of wires and is electrically insulated from the wiring plane by a dielectric layer. The lower mesh plane includes a third set of wires, and each wire of the third set of wires extends parallel to the first axis. The lower mesh plane also includes a fourth set of wires. Each wire of the fourth set of wires extends parallel to the second axis, intersects with and is electrically interconnected to the third set of wires, and is electrically insulated from the wiring plane by a dielectric layer. The electronic package also includes a first region of the upper and lower mesh planes, where adjacent wires of the second set of wires are separated by a first distance and corresponding adjacent wires of the fourth set of wires are separated by the first distance. The electronic package also includes a second region of the upper and lower mesh planes, where adjacent wires of the second set of wires are separated by a second distance that is greater than the first distance and corresponding adjacent wires of the fourth set of wires are separated by the second distance.

Embodiments may also be directed towards an electronic system for reducing signal crosstalk between adjacent signal wires within an electronic package. The system includes the electronic package electrically and mechanically connected to a printed circuit board (PCB). The electronic package includes a wiring plane located in a coplanar orientation between an upper mesh plane and a lower mesh plane. The wiring plane includes a set of adjacent signal wires. Each signal wire of the set of adjacent signal wires extends parallel to a first axis and is electrically insulated by a dielectric layer. The electronic package also includes the upper mesh plane. The upper mesh plane includes a first set of wires, each wire of the first set of wires extending parallel to the first axis. The upper mesh plane also includes a second set of wires. Each wire of the second set of wire extends parallel to a second axis that is orthogonal to the first axis, intersects with and electrically interconnected to the first set of wires and is electrically insulated from the wiring plane by a dielectric layer. The electronic package also includes the lower mesh plane. The lower mesh plane includes a third set of wires, each wire of the third set of wires extending parallel to the first axis and a fourth set of wires. Each wire of the fourth set of wires extends parallel to the second axis, intersects with and electrically interconnected to the third set of wires and is electrically insulated from the wiring plane by a dielectric layer. The electronic package also includes a first region of the upper and lower mesh planes, where adjacent wires of the second set of wires are separated by a first distance and corresponding adjacent wires of the fourth set of wires are separated by the first distance. The electronic package also includes a second region of the upper and lower mesh planes, wherein adjacent wires of the second set of wires are separated by a second distance that is greater than the first distance and corresponding adjacent wires of the fourth set of wires are separated by the second distance. The system also includes an integrated circuit (IC) electrically and mechanically connected to the electronic package and the PCB.

Embodiments may also be directed towards a computer-implemented method for designing and fabricating a multilayer ceramic (MLC) electronic package having modulated mesh planes. The method includes receiving, with an electronic design automation (EDA) program, a design for a multilayer ceramic electronic package having uniform mesh planes. The method also includes determining, with an electromagnetic structure simulation program, far-end crosstalk (FEXT) between adjacent signal lines within the design for the MLC electronic package. The method also includes modifying, with a layout editing program, in response to the FEXT for the design being above a crosstalk threshold, the design by modulating the uniform mesh planes in the direction of signal propagation to create a modified design having modulated mesh planes. The method also includes fabricating, at a manufacturing facility, the MLC electronic package in accordance with the modified design, the modified design of the electronic package including modulated mesh planes.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
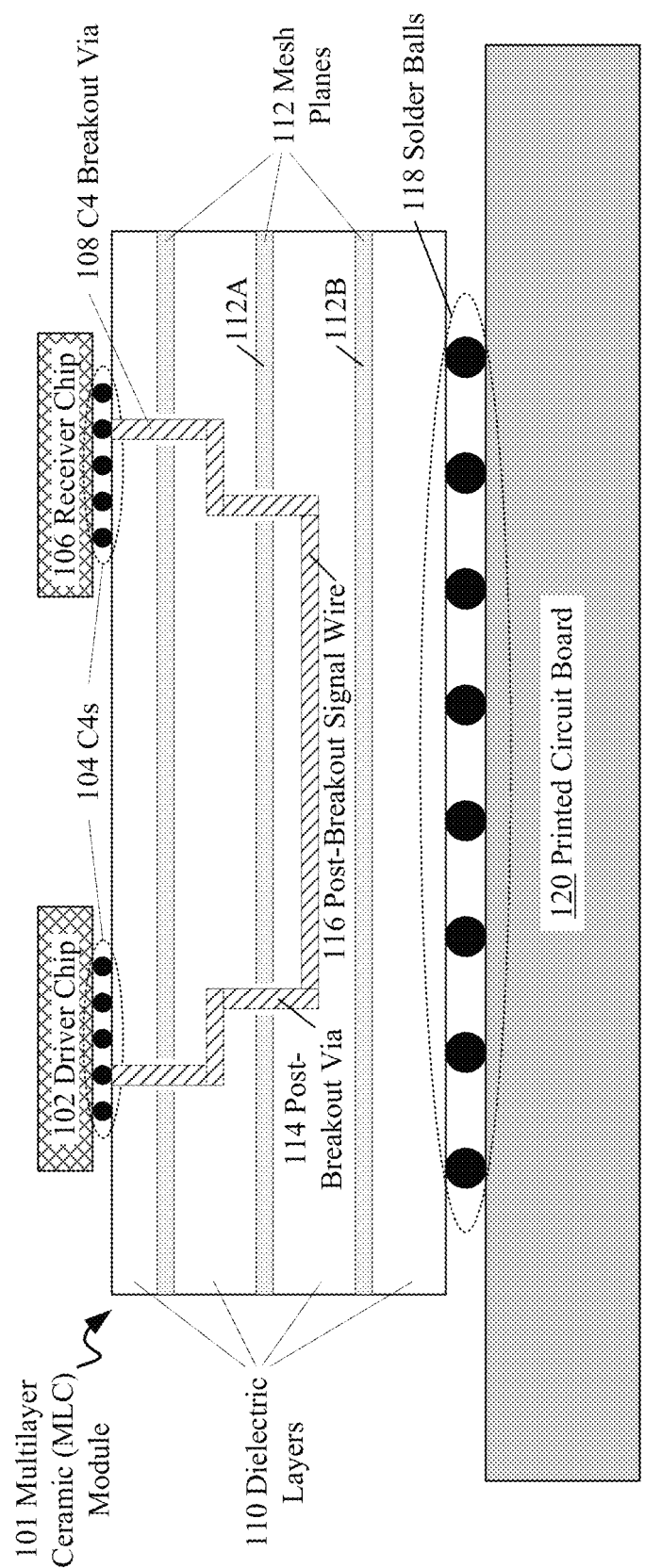
FIG. 1 depicts a cross-sectional view of a glass-ceramic (GC) multilayer ceramic (MLC) module within a computing system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

In the drawings and the Detailed Description, like numbers generally refer to like components, parts, steps, and processes.

DETAILED DESCRIPTION

Certain embodiments of the present disclosure can be appreciated in the context of providing multilayer ceramic (MLC) electronic packages with reduced signal crosstalk. MLC electronic packages can be used in conjunction with electronic equipment such as processor integrated circuits (ICs), which may be used to provide computational capabilities to electronic equipment such as servers. Such servers may include, but are not limited to web servers, application servers, mail servers, and virtual servers. While not necessarily limited thereto, embodiments discussed in this context can facilitate an understanding of various aspects of the disclosure. Certain embodiments may also be directed towards other equipment and associated applications, such as providing MLC electronic packages with reduced signal crosstalk for ICs used in electronic equipment such as computing systems, which may be used in conjunction with a wide variety of computational and data processing applications. Such computing systems may include, but are not limited to, supercomputers, high-performance computing (HPC) systems, and other types of special-purpose computers. Embodiments may also be directed towards providing MLC electronic packages with reduced signal crosstalk for ICs used in consumer and small office/home office (SOHO) electronic equipment such as personal computers, laptops, mobile and network server devices.

It can be understood that the terms "wires," "lines" and "traces" are used interchangeably herein, with reference to various electrically conductive structures used to provide electrical interconnections between components or circuits connected to an MLC package. Similarly, the terms "supplemental wires," "rods," "short rods" and "long rods" are used interchangeably herein, with reference to various electrically conductive structures used to provide supplemental electrical interconnections between existing wires of a mesh structure within an MLC package. The terms "glass ceramic (GC)," "ceramic" and "dielectric" are used interchangeably herein, with reference to materials used to provide structure to an MLC package, and insulate various conductive structures therein from one another.

MLC electronic packages can be useful for providing stable and reliable mechanical attachment and electrical interconnection of ICs to printed circuit boards (PCBs).

MLC packages can be used, for example, within electronic computing systems such as servers, mainframe computers, supercomputers and SOHO computing equipment. The relatively fine geometry wiring features and coefficient of thermal expansion (CTE) characteristics of MLCs make them particularly useful as intermediate structures located between a PCB and an IC chip.

MLC packages or modules can include multiple, stacked layers of dielectric material such as ceramics or glass-ceramics, commonly referred to as ceramic "greensheets." Greensheet layers of a desired size and configuration may be patterned, for example, by a screen printing process, with a conductive, e.g., metallic, paste to create electrically conductive wires on a surface of each greensheet. Via holes can be formed within through-holes punched in the greensheet layers, and subsequently filled with conductive paste, in order to form electrical interconnections between wires formed on the conductive layers or planes. Greensheet layers that have been punched with via holes and patterned with conductive paste can be subsequently aligned and assembled in a stack, pressed, and sintered in an oven at a relatively high temperature. This process results in a rigid, unitary ceramic module having internally interconnected conductive wires.

Wires or traces designed to conduct electrical signals through the module can be arranged on a surface, i.e., "wiring plane," of a dielectric layer while conductive planes formed on dielectric layers above and below the wiring plane can be patterned and used as "reference planes." Reference planes can be used to provide shielding and control the impedance of the signal traces. Wires within an MLC reference plane can be arranged as a "meshed" structure, i.e., repeating pattern of horizontal lines electrically connected to a repeating pattern of vertical lines within the reference plane. This type of mesh reference plane structure can allow for superior adhesion of adjacent greensheet layers to each other during the pressing and sintering processes, in comparison to a structure that includes "solid," i.e., non-meshed, reference planes.

The use of such mesh reference plane structures within an MLC package can result in significant mutual inductive and mutual capacitive coupling between neighboring signal lines located on various wiring planes of the MLC package. This inductive and capacitive coupling can result in significant signal crosstalk or noise coupling between nearby signal lines within the MLC package. Crosstalk between signal lines can distort the amplitude and timing of a "clean" or "victim" signal, due to inductive and capacitive coupling between one or more active "aggressor" signals and the nearby victim signal. The signal distortion experienced by the victim signal may not be necessarily correlated to data patterns of the victim signal itself.

Crosstalk-induced victim signal distortion can produce significant reduction of data eye openings and a subsequent increase in error rates within serial communication links. Crosstalk-induced distortion can also produce significant increases in clock and data signal jitter, which can also reduce the reliability and/or effective data rate of high-speed digital signals. Crosstalk measured and/or observed at the driver/transmitter or driven end of a victim signal wire is generally referred to as "near-end crosstalk" (NEXT). Similarly, crosstalk measured and/or observed at the receiver end of a victim signal wire is generally referred to as "far-end crosstalk" (FEXT).

The operating speeds and frequencies of electronic computing systems, e.g., servers and supercomputers, in which MLC packages are employed are continually increasing. For example, digital data transmission rates of 25 Gbps or higher are anticipated to be used in future computing systems. Increased IC signal frequencies and rise/fall times can exacerbate MLC package noise coupling and resulting crosstalk. Crosstalk-induced signal degradation can significantly limit effective data transmission rates through an MLC package, which, in turn, can limit data transmission rates for an entire computing system that includes an MLC package. The reduction of crosstalk in IC packages such as MLC packages is therefore a significant design focus for furthering present and future electronic computing system performance.

An MLC electronic package designed and fabricated according to embodiments can be useful for providing significantly reduced crosstalk levels for signal wires within the MLC package. Modulated mesh plane structures, used as reference planes, can be fabricated within the MLC design, providing a structure useful for reducing relatively high FEXT levels. In addition, via interconnect structures and associated inter-plane vias, in conjunction with supplemental wires, also referred to as "rods," spanning openings in the modulated mesh plane structures can be implemented. These alternating length rods can be used to shorten and re-route adjacent signal and return current paths, which can reduce the effective electrical, i.e., capacitive and inductive, coupling between victim nets and nearby aggressor nets. Reducing the electrical coupling between nearby nets can be particularly effective in providing reduced NEXT and FEXT for signal nets within the MLC package. The reduction in both FEXT and NEXT within the MLC package can result in the increase of data transmission speeds and reduction of error rates, which can be particularly useful in extending electronic computing system performance to increased levels. According to embodiments, the improvements described above can be fabricated within existing dielectric layers of an MLC package, by using existing and proven MLC package design/fabrication processes, technologies and material sets. This ease of design and fabrication of modulated mesh plane structures can be useful by providing cost-effective, enhanced electrical performance for the MLC package without requiring a major redesign or manufacturing retooling effort. According to embodiments, the improvements described above can be fabricated within existing dielectric layers of an MLC package, by using existing and proven MLC package design/fabrication processes, technologies and material sets.

Various aspects of the present disclosure, including using a combination of mesh modulation and alternating length rods, may be useful for to reduce noise coupling, i.e., crosstalk, between nearby signal wires within an MLC package. FEXT can be reduced significantly, for example, by approximately 10 dB over a 40 GHz signal frequency range. Similarly, NEXT an be reduced significantly, for example, by approximately 5 dB over the same 40 GHz signal frequency range.

An MLC package designed and fabricated according to certain embodiments may be compatible with existing and proven electronic computing systems, and may be a useful and cost-effective way to provide enhanced MLC package and overall electronic computing system performance. An MLC package fabricated according to embodiments of the present disclosure may be integrated within an existing electronic computing system design.

Aspects of the various embodiments may be used to provide reduced electrical coupling between signal traces within an MLC package, which can enhance overall package electrical performance and reliability. Aspects of the various embodiments may also be useful for providing cost-effective performance enhancement for MLC packages, by using existing and proven MLC package design and simulation practices, material sets and fabrication technologies.

It can be understood that particular dimensions and dimensional ratios, as depicted and discussed in reference to the figures herein, are provided as examples only, and are not to be construed as limiting in any way. For example, the size or aspect ratio of a depicted mesh plane, or the number of mesh areas depicted therein may be limited for ease of illustration. According to embodiments, mesh planes of any applicable size may be employed in the practice of the invention.

Certain embodiments are directed towards electronic computing systems that include MLC modules configured to provide electrical interconnection and mechanical attachment of one or more ICs to a PCB. Such MLC modules, when designed and fabricated with modulated mesh planes according to embodiments, can be useful for reducing crosstalk between adjacent signal wires within the MLC package. FIG. 1 depicts a cross-sectional view of an electronic computing system configured with an electronic package, i.e., GC MLC module 100, according to embodiments of the present disclosure. Electronic computing systems having an MLC module 101 can include, but are not limited to, servers, supercomputers, HPC systems, certain types of special-purpose computers, and SOHO electronic equipment.

According to embodiments, the MLC module 101 is electrically and mechanically connected to PCB 120 by solder balls 118, and driver chip 102 and receiver chip 106 are electrically and mechanically connected to MLC module 101 by controlled collapsible chip connections (C4s) 104. According to embodiments, one or more ICs or chips can be electrically and mechanically connected to the MLC module 101, also referred to as a "chip carrier." In some embodiments, the MLC module 101 can be used as a single-chip module (SCM), and in some embodiments the MLC module 101 can be used as a multi-chip module (MCM).

Driver chip 102 and receiver chip 106 can be various types of ICs used within an electronic computing system. For example, chips 102 and 106 can include one or more processors, memory controllers, graphics processing units (GPUs), or other types of ICs. Chips 102 and 106 can drive and receive various types of signals, for example, serial signals used within high-speed serial communication links. PCB 120 can include various types of PCBs including, but not limited to, motherboards/backplanes and daughter cards, which can be electrically interconnected to other components of an electronic computing system through connectors or cables.

In fabrication processes, solder balls 118 can be reflowed in order to establish a durable physical and electrical connection between MLC module 101 and PCB 120. Similarly, C4s 104 can be reflowed in order to establish a durable physical and electrical connection between chips 102 and 106 and MLC module 101.

In embodiments, electrical signal paths can be established between chips, e.g., 102 and 106, as depicted, and/or between chips such as 102 and 106 and PCB 120. Such electrical signal paths can be used, for example, to transmit high-speed serial data from a driver device, e.g., driver chip 102, to a receiver device, e.g., receiver chip 106. In some embodiments, electrical signal paths can be established between two or more chips, e.g., 102 and 106, as depicted. In some embodiments, electrical signal paths can be established between chips such as 102 and 106 and PCB 120. The electrical signal path depicted in FIG. 1 includes C4s 104, C4 breakout vias 108, post-breakout via 114 and post-breakout signal wire 116. According to embodiments, C4 breakout via 108, post-breakout via 114 and post-breakout signal wire 116 can be fabricated from various types of metals and metal alloys such as copper, gold, silver and palladium.

According to embodiments, dielectric layers 110 can include ceramic and/or GC material, however other types of ceramic or dielectric material are possible. Dielectric layers 110 are useful for insulating conductive mesh and signal wires from each other. In the practice of the present disclosure, the material composition and thickness of dielectric layers 110 can be selected by an electronic package designer in order to meet various specified signal integrity and manufacturing constraints. In embodiments, mesh planes 112 can include various types of mesh structures described in depicted with reference to the figures herein.

In accordance with MLC package design methodologies, wires and vias, e.g., C4 breakout via 108, located in relatively close proximity to chips 102 and 106, mounted on an MLC module 101 may have smaller feature sizes than other types of wires and vias, e.g., post-breakout signal wire 116 and post-breakout via 114, that are relatively further away from a chip.

While FIG. 1 depicts only a single post-breakout signal wire 116, in embodiments additional, neighboring wires may be present, and are discussed in reference to the figures herein. These neighboring signal wires may be located in the same wiring plane, e.g., 216A, FIG. 2, or may be located in nearby wiring planes. Electromagnetic and capacitive coupling between neighboring signal wires may result in crosstalk between post-breakout signal wire 116 and these neighboring signal wires. Accordingly, embodiments of the present disclosure are particularly directed towards wires such as post-breakout signal wire 116, located on a wiring plane, and the mesh planes, e.g., upper mesh plane 112A and lower mesh plane 112B adjacent to the wiring plane.

Figure 2:
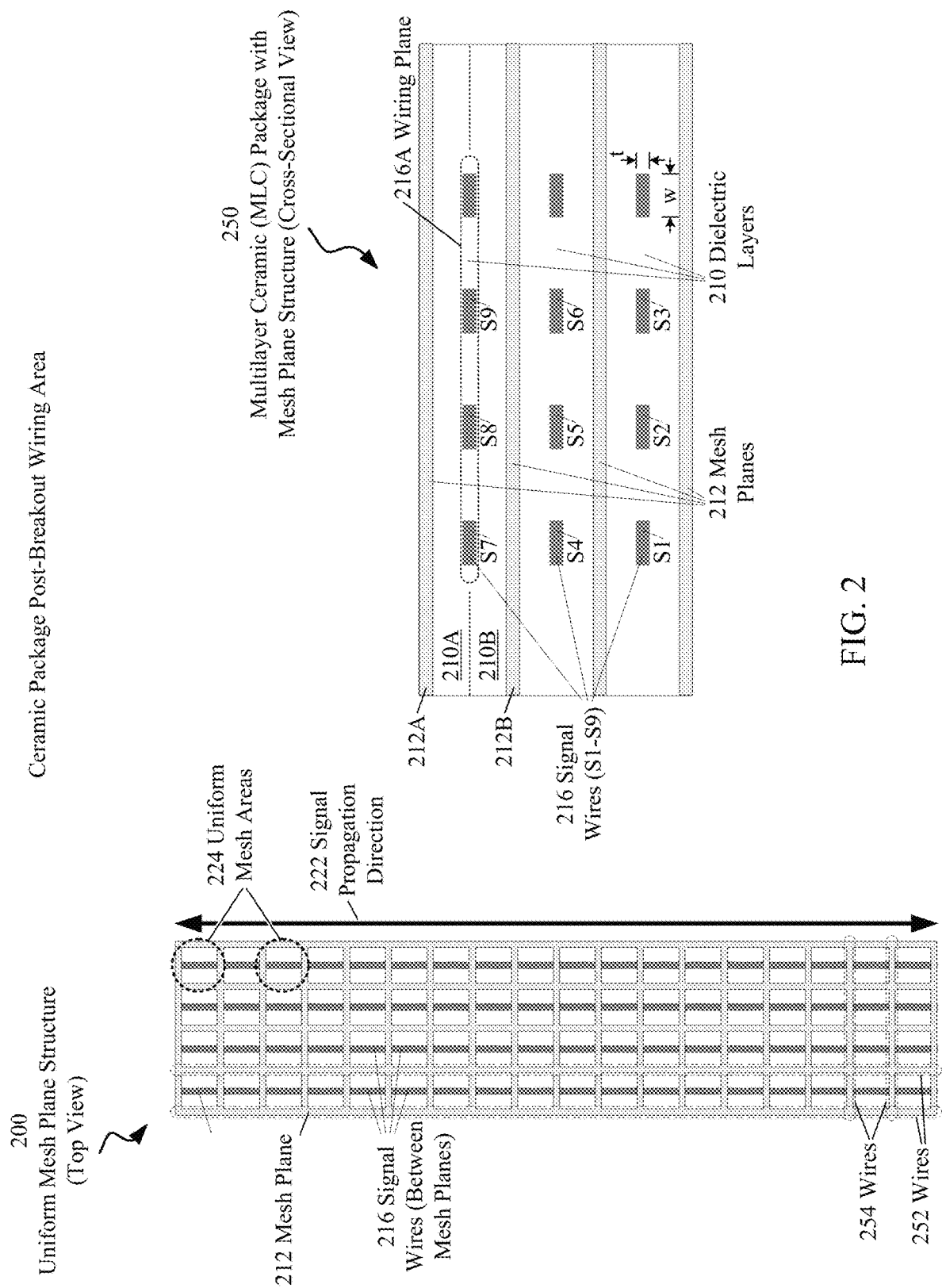
FIG. 2 includes top view and side view depictions of an MLC package with a uniform mesh plane structure, according to embodiments consistent with the figures.

FIG. 2 includes two consistent views, top view 200 and side view 250, each depicting a ceramic package with a uniform mesh plane structure, according to embodiments consistent with the figures, particularly FIG. 1. Top view 200 and cross-sectional view 250 can be useful for representing an area of "post-breakout" wiring, e.g., mesh planes 212A, 212B, dielectric layers 210A, 210B and wiring plane 216A, that are consistent with post-breakout signal wire 116, upper mesh plane 112A and lower mesh plane 112B of FIG. 1. Such layers can be fabricated in accordance with various fabrication process described above.

It can be understood that mesh plane 212, view 200 is a top view representation of mesh plane 212, and particularly upper mesh plane 212A and lower mesh plane 212B of view 250. Dielectric layers 210 are similarly consistent with dielectric layers 110, FIG. 1. Mesh planes 212, including wires 252 and wires 254, and signal wires 216, i.e., wires S1-S9, can be fabricated from various metals and/or alloys such as copper, gold, silver, palladium, consistent with wires described in reference to FIG. 1. Mesh planes, e.g., 212, 212A and 212B can be useful for providing a reference plane, controlled impedance and shielding for signal wires 216.

According to embodiments, MLC package 250 includes a wiring plane 216A located in a coplanar orientation between upper mesh plane 212A and lower mesh plane 212B. Wiring plane 216A includes a set of signal wires located between mesh planes 212A and 212B. Each signal wire, e.g., S1-S9, of the set of signal wires 216 extends in a direction parallel to signal propagation direction 222 and is electrically insulated from adjacent wires and mesh planes by dielectric layers 210.

Upper and lower mesh planes 212A and 212A each includes a first set of wires, e.g., wires 252, each extending parallel to a first axis along signal wires 216, and a second set of wires, e.g., wires 254, each extending orthogonal to the first axis. The two sets of wires 252 and 254 are electrically interconnected at their intersections. Both sets of wires are electrically insulated from the wiring plane by dielectric layers, e.g., dielectric layers 210, 210A and 210B.

The intersections of the sets of wires forms a set of uniform mesh areas/openings 224 in both the upper mesh plane 212A and in the lower mesh plane 212. The uniform mesh areas 224 have rectangular perimeters that include portions of adjacent wires of the first set of wires 252 intersect with portions of adjacent wires of the second set of wires 254. Top view 200 depicts the uniform mesh areas 224 having a uniform mesh spacing, i.e., distance between wires 254, along the signal propagation direction 222.

The 9 neighboring signal wires S1-S9, arranged as depicted in FIG. 2, are used as a basis for electromagnetic models employed in the calculation of NEXT and FEXT. NEXT and FEXT between the victim signal wire S5 and the nearby aggressor signal wires S1-S4 and S6-S9, can be computed using a frequency-domain 3-D electromagnetic field solver program. Electromagnetic simulation models for this field solver program are based on physical characteristics, e.g., geometric feature arrangements and dimensions such as those depicted in FIGS. 2, 3, 6 and 11. For example, a width "w," a length, and a thickness "t" of signal wires S1-S9 as well as dimensions of wires, e.g., 252 and 254, of adjacent mesh planes 212, i.e., upper mesh plane 212A and lower mesh plane 212B, can be used for simulation modeling purposes.

By way of example, in some embodiments and for purposes of simulation, a width "w" of signal wires S1-S9 can be 15 μm, a signal wire thickness "t" can be 59 μm and a signal wire length can be 6371 μm. In some embodiments, wires having other dimensions may be used. In some embodiments, a width of wires used in a mesh plane, e.g., 212 can be 61 μm, a thickness can be 15 μm and lengths can be determined based on mesh plane 212 overall dimensions.

Mesh plane wires, e.g., 252, 254, can be specified and fabricated to be somewhat wider than signal line wires, e.g., S1-S9, which can provide more effective blocking of electric and magnetic fields between aggressor wires and victim wires. Such blocking can result in reduced crosstalk between neighboring signal lines. In the practice of the present disclosure, wire dimensions can be specified or adjusted by an electronic package designer in order to provide control of wiring impedance. A size of a mesh area, e.g., 224, may similarly be specified or adjusted in order to increase electromagnetic isolation between signal planes. An MLC package fabricated as depicted in views 200, 250, may, in some cases have unacceptably high crosstalk levels for use in reliably transmitting high-speed serial data communication signals.

Figure 3:
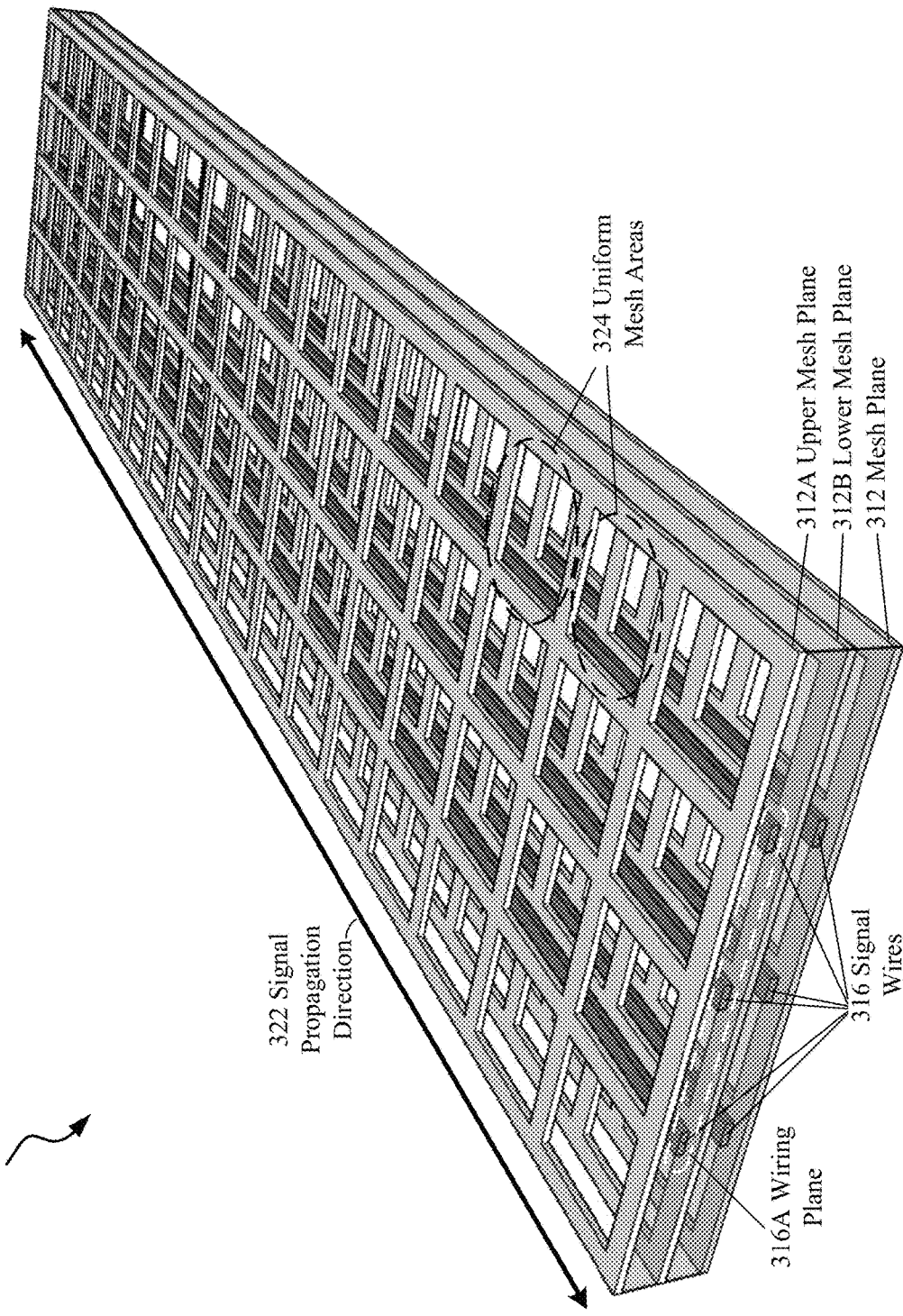
FIG. 3 is an isometric view of an MLC package with a uniform mesh plane structure, according to embodiments consistent with the figures.

FIG. 3 is an isometric view of an MLC package with uniform mesh plane structures, according to embodiments consistent with the figures, particularly FIGS. 1 and 2. FIG. 3 can be useful for representing area(s) of post-breakout wiring, consistent with post-breakout signal wire 116, FIG. 1 and with the views 200, 250 of FIG. 2. FIG. 3 can provide a visual understanding and perspective of relative 3-D positions and orientations of various elements of the MLC package, according to embodiments. For example, FIG. 3 depicts wiring plane 316A, signal wires 316, uniform mesh areas 324, mesh plane 312, upper mesh plane 312A, and lower mesh plane 312B, consistent with respective elements depicted in and discussed with respect to FIG. 2. Signal propagation direction 322 is in the same direction, i.e., along the same axis, as the extension of signal wires 316, consistent with FIG. 2.

Figure 4:
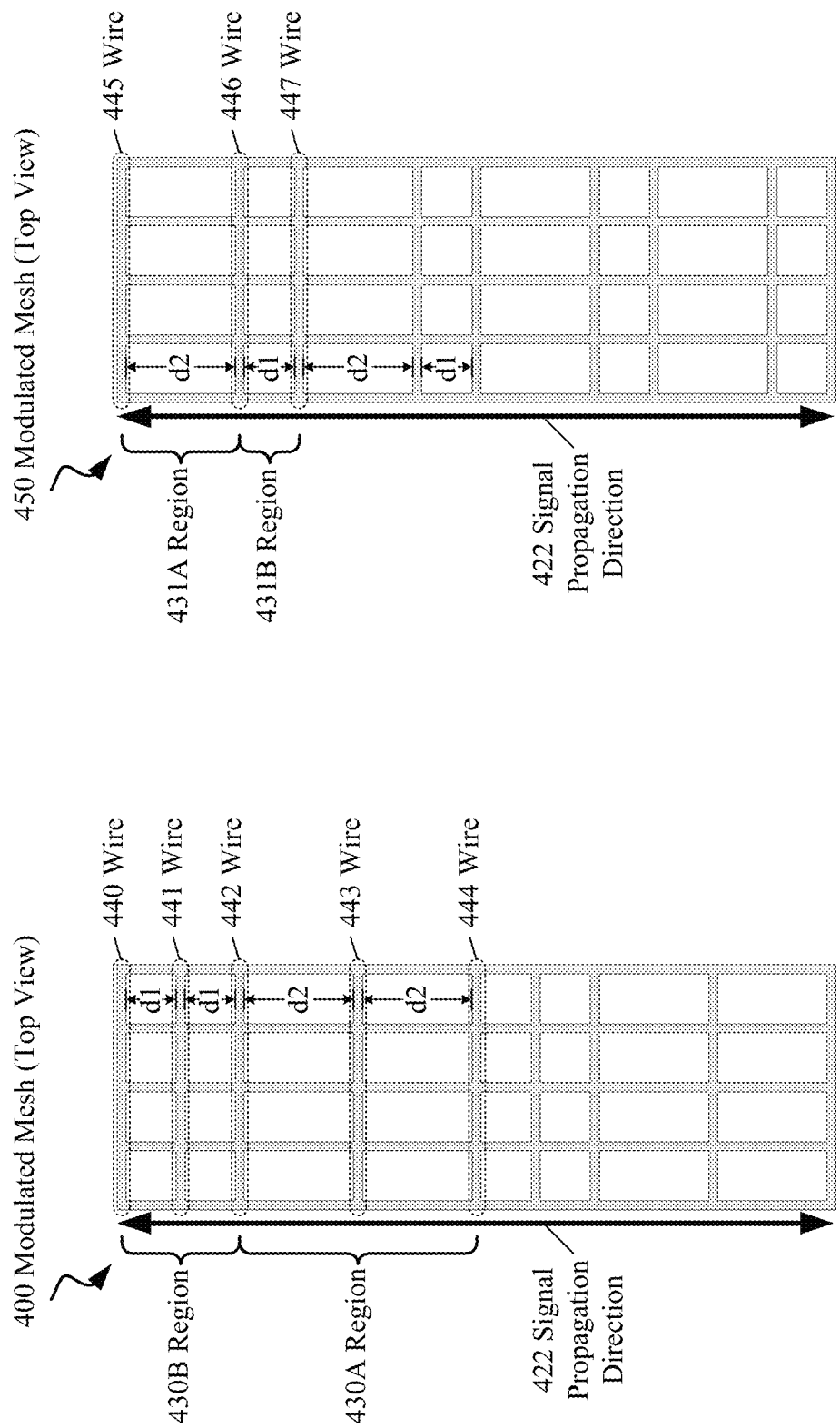
FIG. 4 includes two example depictions of a modulated mesh, according to embodiments consistent with the figures.

FIG. 4 includes two consistent top views 400 and 450, each depicting an example modulated mesh, according to embodiments consistent with the figures, particularly FIGS. 1 and 2. The term "modulated" is used to describe the meshes of views 400 and 450 as these meshes can be a "tuned" or "adjusted" version of a uniform mesh, as depicted in FIGS. 2 and 3. Modulated meshes can be used as reference planes, can be fabricated within an MLC package design, and can provide a structure that is useful for reducing relatively high FEXT levels.

According to embodiments, view 400 depicts a mesh that is modulated, i.e., has a number of different spacings between adjacent wires that are oriented orthogonally to the signal propagation direction 422. For example wire pairs 440 and 441, and wire pairs 441 and 442 are each separated by a distance d1. Wire pairs 442 and 443, and wire pairs 443 and 444 are each separated by a distance d2, which is greater than distance d1. In some embodiments, a ratio of the second distance d2 to the first distance d1 can be in a range between 2 and 3, however this ratio is not to be construed as limiting. An electronic package designer can vary the ratio of the distances d2 to d1 in response to simulated crosstalk levels obtained from electromagnetic field-solver simulations of particular mesh/MLC package structures. In the practice of the present disclosure, changing the ratio of distances between adjacent wires, e.g., wires 440, 441 and 442 can be accomplished through the use of electronic design automation (EDA) tools such as a layout editor, or an automated or semi-automated layout generation tool.

View 400 depicts region 430B that includes adjacent wires 440, 441 and 442 that are separated by the distance d1, and region 430A that includes adjacent wires 442, 443 and 444 that are separated by the distance d2. While a single mesh plane is depicted in view 400, according to embodiments, the above-described line spacing can be consistent for mesh planes located both above and below a particular wiring plane. Such mesh planes can correspond, for example, to upper mesh plane 612A and lower mesh plane 612B, FIG. 6. The meshes depicted in views 400 and 450 include two wire spacings d1 and d2 along signal propagation direction 422. However, this is not to be construed as limiting; according to embodiments, more than two wire spacings are possible.

View 450 depicts region 431B that includes adjacent wires 446 and 447 that are separated by the distance d1, and region 431A that includes adjacent wires 445 and 446 that are separated by the distance d2. In contrast to the mesh 400, each region of mesh 450 includes only one pair of adjacent wires separated by a particular distance, e.g., d1, whereas each region of mesh 400 includes more than one pair of adjacent wires separated by a particular distance. Meshes 400 and 450 depict two configurations of regions, each having a regularly repeating pattern of wire spacings. Other arrangements of regions are possible, including more than two wire spacings, and both regular, irregular, and pseudo-regular patterns of wire spacings. Such patterns may be determined based on crosstalk results from electromagnetic simulations of various candidate mesh structures. Meshes 400 and 450 can be particularly useful, when situated surrounding a wiring plane, in managing and reducing FEXT on signal wires within an MLC package.

Figure 5:
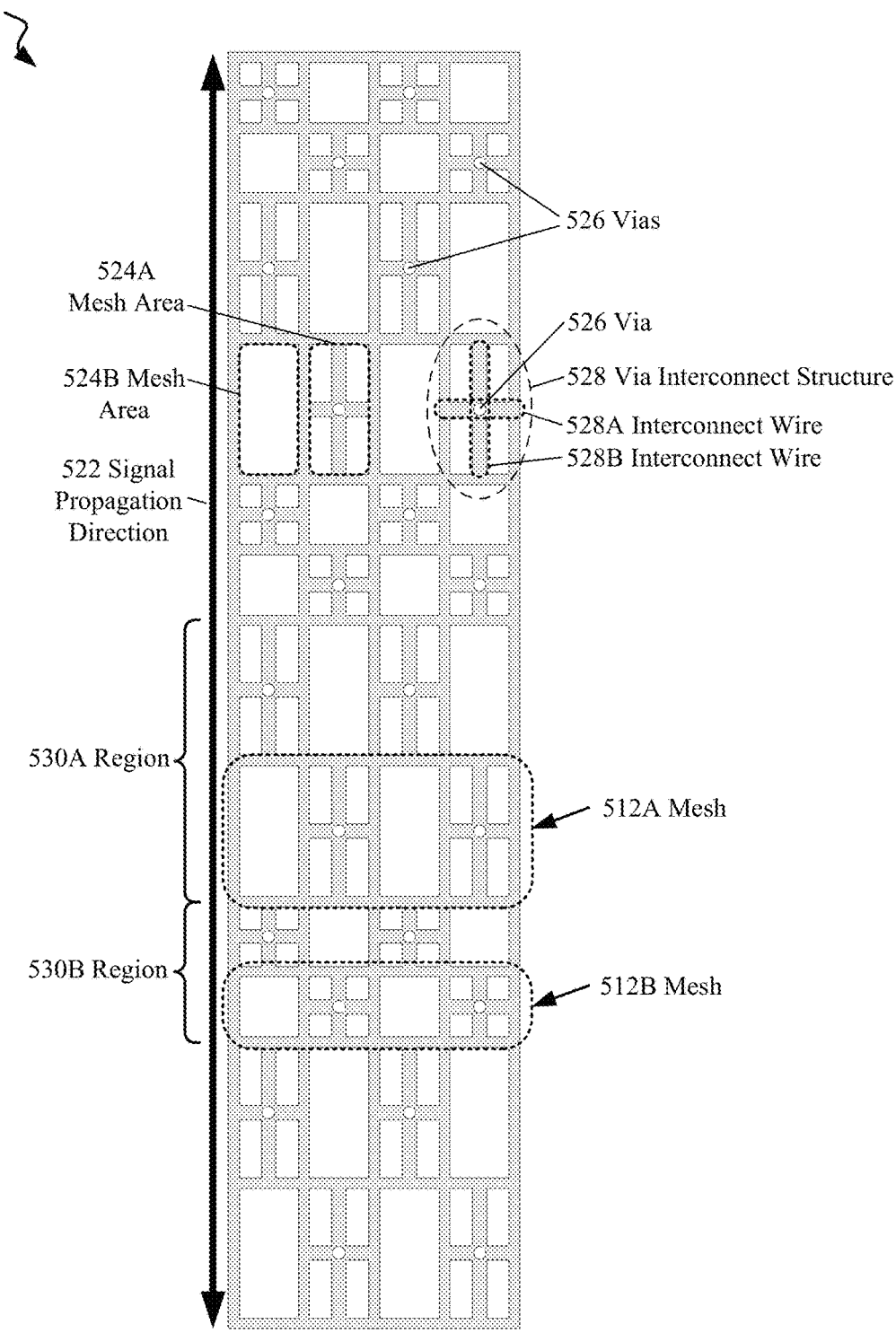
FIG. 5 depicts a top view of a modulated mesh plane structure, according to embodiments consistent with the figures.

FIG. 5 depicts a top view of a modulated mesh plane structure 500, according to embodiments consistent with the figures, particularly FIGS. 1, 2 and 4. Modulated mesh plane structure 500 can be useful in depicting a reference plane, e.g., a GND or voltage plane, having meshes with modulated, alternating width openings along the signal propagation direction 522.

Modulated mesh plane structure 500 includes regions 530A and 530B, generally consistent with regions 430A and 430B, FIG. 4. Regions 530A and 530B include instances of meshes 512A and 512B, respectively. According to embodiments, instances of mesh 512A and mesh 512B each include an alternating pattern of instances of "open" mesh areas and mesh areas populated with a via interconnect structure. For example, mesh 512A includes an alternating pattern of instances of open mesh areas 524B and mesh areas 524A that are populated with via interconnect structures 528 and vias 526. Mesh areas 524A and 524B each have a rectangular perimeter formed by portions of two adjacent wires oriented parallel to signal propagation direction 522 and two adjacent wires oriented orthogonally to signal propagation direction 522. Mesh 512B includes a similar alternating pattern of instances of open mesh areas and mesh areas that are populated with via interconnect structures. According to embodiments, a first portion of the mesh areas of an MLC mesh are open, and a second portion of the mesh areas are populated with via interconnect structures and vias.

Each via interconnect structure, e.g., 528, includes interconnect wires, e.g., 528A that electrically interconnect the two adjacent wires oriented parallel to signal propagation direction 522 to a corresponding via 526. Each via interconnect structure also includes interconnect wires, e.g., 528B, that electrically interconnect the two adjacent wires oriented orthogonally to signal propagation direction 522 to the corresponding via 526.

Upper and lower via interconnect structures 528 can be located within upper and lower mesh planes, respectively, which are located above and below, respectively, a wiring plane of an MLC package. Upper and lower mesh planes can be interconnected by vias, e.g., 526, to provide shielding, reduced crosstalk, and controlled impedance to signal wires located within the wiring plane. The depiction of via interconnect structures 528 in FIG. 5 is not to be construed as limiting in any way; according to embodiments, via interconnect structures, e.g., 528, can include a single or multiple interconnect wires, e.g., 528A and 528B, arranged in a variety of configurations.

Figure 6:
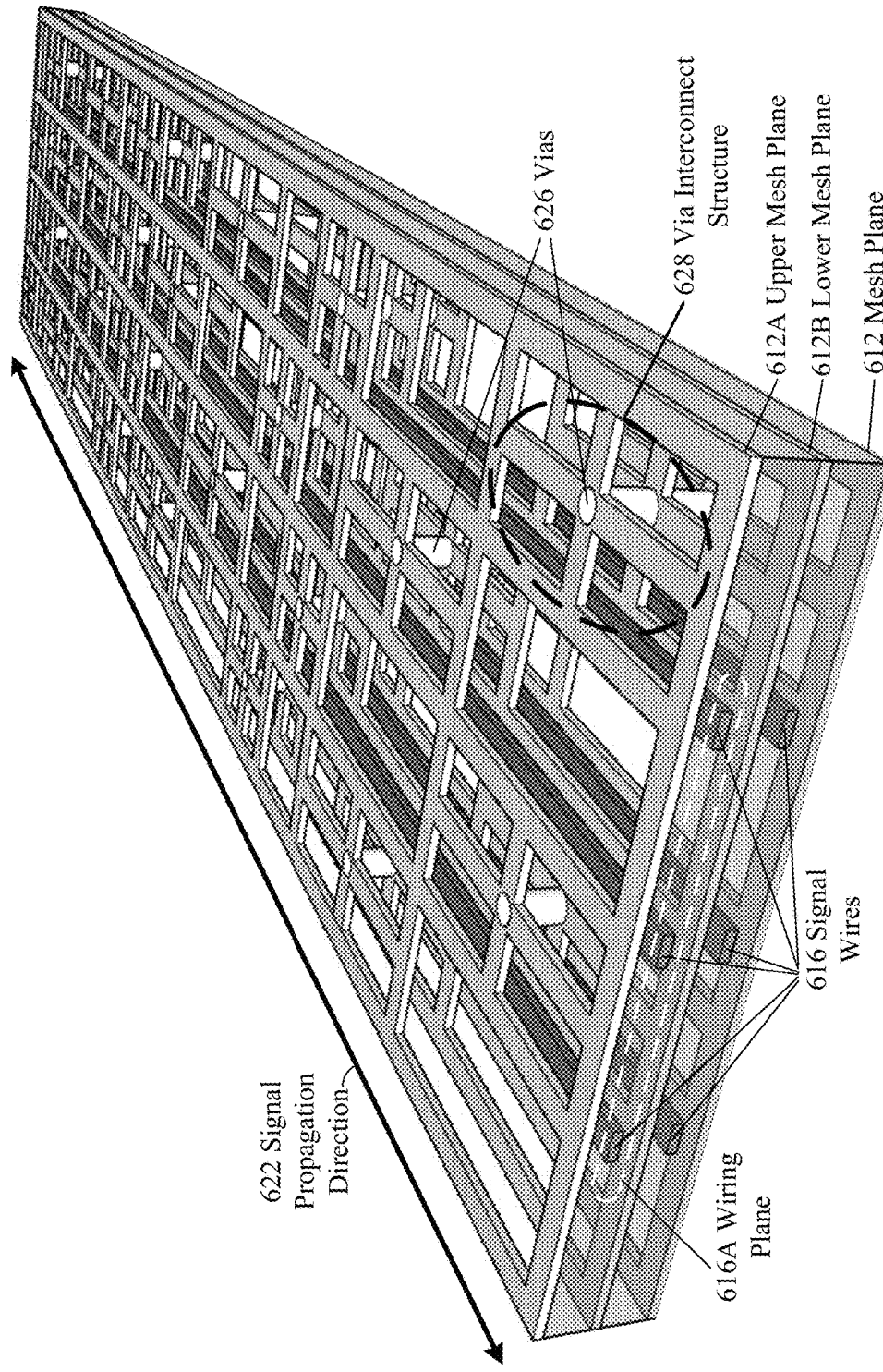
FIG. 6 is an isometric view of an MLC package with a modulated mesh plane structure, according to embodiments consistent with the figures.

FIG. 6 is an isometric view of an MLC package with uniform mesh plane structures including via interconnect structures, according to embodiments consistent with the figures, particularly FIGS. 4 and 5. FIG. 6 can be useful for representing area(s) of post-breakout wiring, consistent with post-breakout signal wire 116, FIG. 1 and with the views 200, 250 of FIG. 2.

FIG. 6 can provide a visual understanding and perspective of relative 3-D positions and orientations of various elements of the MLC package, according to embodiments. For example, FIG. 6 depicts wiring plane 616A, signal wires 616, mesh plane 612, upper mesh plane 612A, lower mesh plane 612B, vias 626 and via interconnect structures 628, consistent with respective elements depicted in and discussed with respect to FIG. 5. Signal propagation direction 622 is in a consistent direction, i.e., along the same axis, as the extension of signal wires 616, consistent with FIG. 5. Features including mesh areas, meshes, regions and interconnect wires, consistent with those depicted and referenced in FIG. 5 are depicted, but not referenced, for clarity of illustration.

FIG. 6 is particularly useful in depicting the use of via interconnect structures, e.g., 628, in conjunction with vias 626 can be used to electrically interconnect mesh planes, e.g., mesh planes 612, 612A and 612B. FIG. 6 also depicts the interleaved arrangement of upper and lower mesh planes, e.g., 612A and 612B, with a wiring plane 616A, and the vertically stacked arrangement of upper and lower via interconnect structure(s), e.g., 628, located, respectively, on upper and lower stacked mesh planes 612A and 612B.

Figure 7:
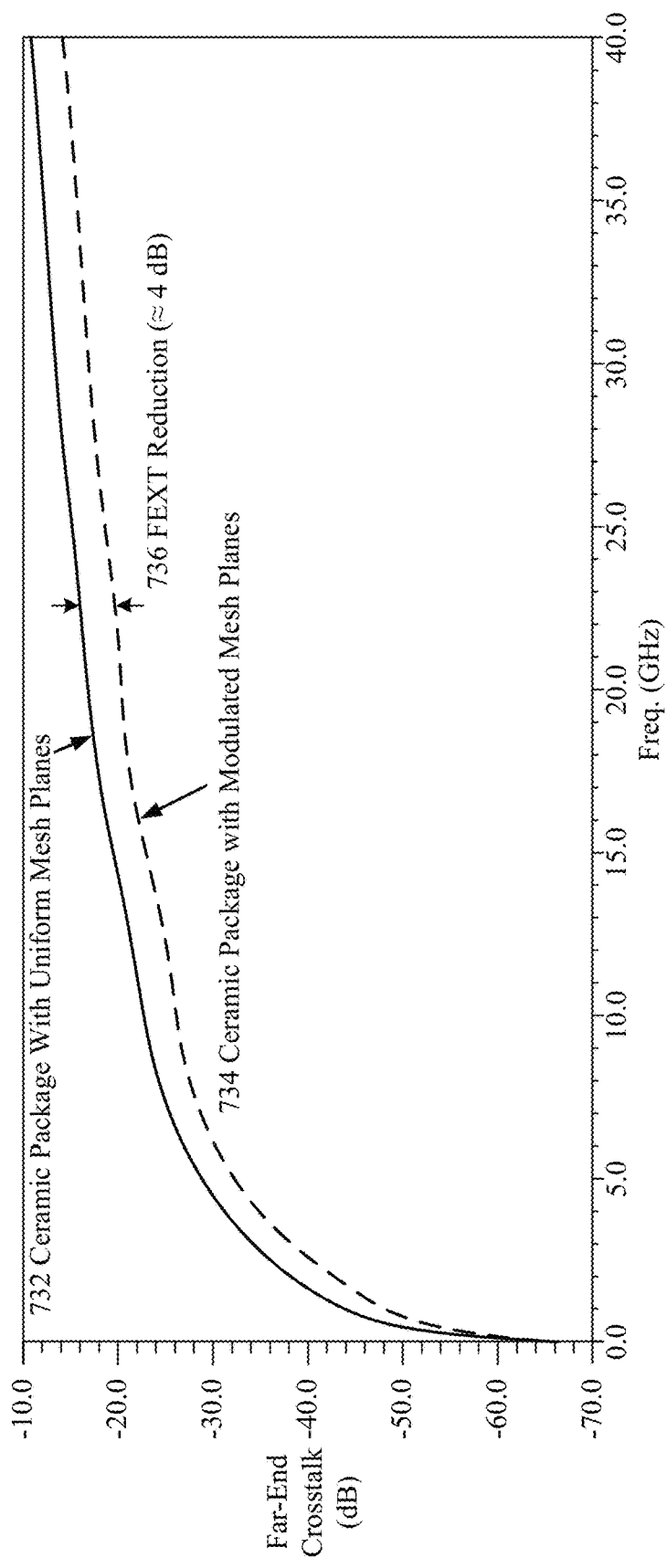
FIG. 7 is a graph depicting far-end crosstalk (FEXT) vs. frequency for a ceramic package with uniform mesh planes and for a ceramic package with modulated mesh planes, according to embodiments consistent with the figures.

FIG. 7 is a graph including plots of FEXT vs. frequency for a ceramic package with uniform mesh planes and for a ceramic package with modulated mesh planes, according to embodiments consistent with the figures, particularly FIGS. 3 and 6. The Y-axis of FIG. 7 corresponds to FEXT, expressed in decibels (dB), while the X-axis of FIG. 7 corresponds to a frequency, expressed in GHz, of signals transmitted over wires within the MLC package. The FEXT vs. frequency plots of FIG. 7 are obtained from simulations performed by a frequency-domain 3-D electromagnetic field solver program.

The 9 neighboring signal wires S1-S9, arranged as depicted in FIG. 2, are used as a basis for electromagnetic models employed in the calculation of NEXT and FEXT. NEXT and FEXT between the victim signal wire S5 and the nearby aggressor signal wires S1-S4 and S6-S9, can be computed using the frequency-domain 3-D electromagnetic field solver program. Electromagnetic simulation models for this field solver program are based on physical characteristics, e.g., geometric feature arrangements and dimensions such as those depicted in FIGS. 2, 3, 6 and 11. For example, a width, a length, and a thickness of signal wires S1-S9 as well as dimensions of wires, e.g., 252 and 254, FIG. 2, of adjacent mesh planes, can be used for simulation modeling purposes.

FIG. 7 depicts a reduction 736 of FEXT of approximately 4 dB across the majority of the frequency range of 0-40 GHz, resulting from the use of modulated mesh planes within an MLC package design. A FEXT reduction of this magnitude can be useful for increasing operating frequencies and reliability of data transmitted through an MLC electronic package.

Figure 8:
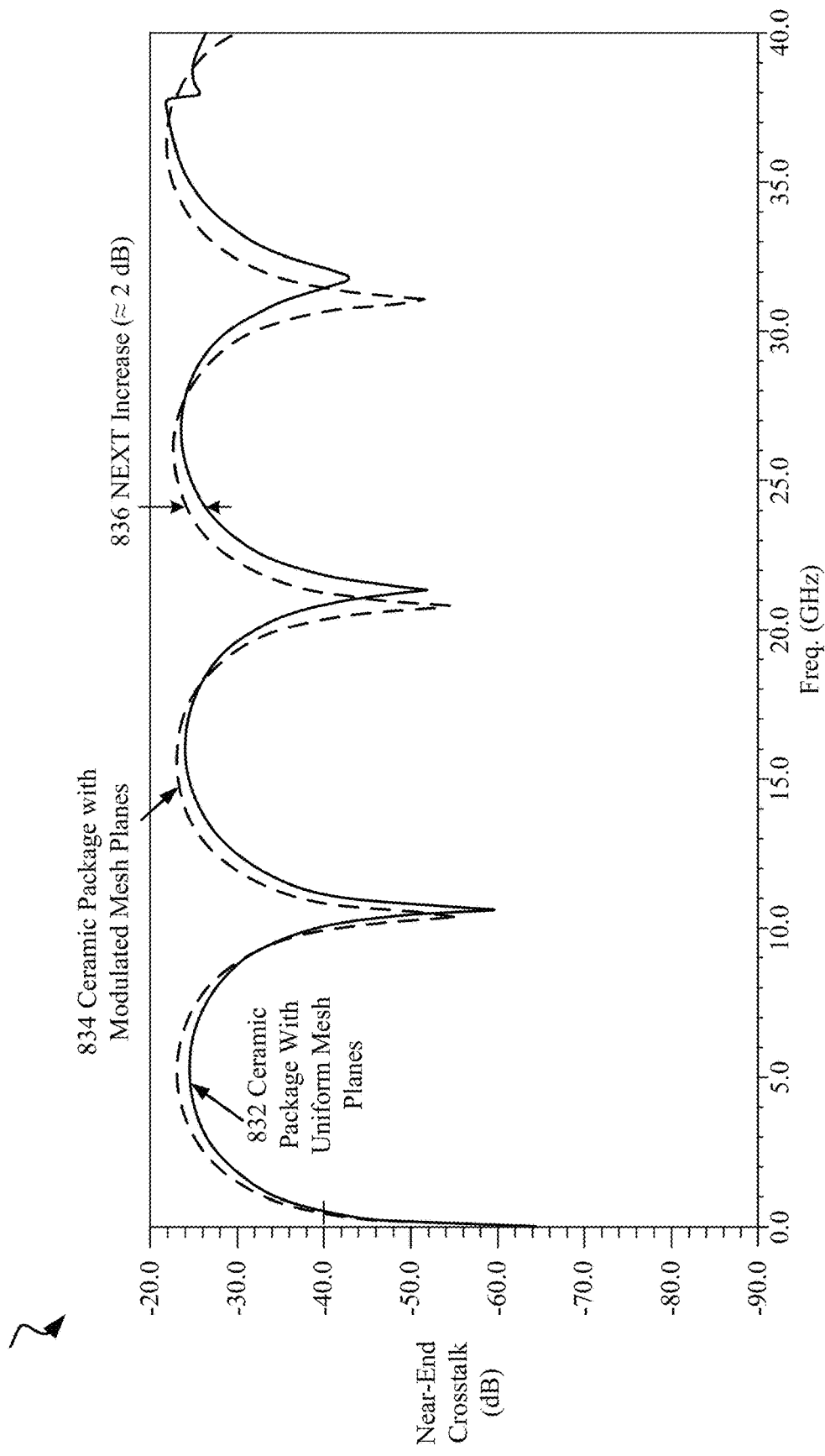
FIG. 8 is a graph depicting near-end crosstalk (NEXT) vs. frequency for a ceramic package with uniform mesh planes and for a ceramic package with modulated mesh planes, according to embodiments consistent with the figures.

FIG. 8 is a graph including plots of NEXT vs. frequency for a ceramic package with uniform mesh planes and for a ceramic package with modulated mesh planes, according to embodiments consistent with the figures, particularly FIGS. 3 and 6. The Y-axis of FIG. 8 corresponds to NEXT, expressed in decibels (dB), while the X-axis of FIG. 8 corresponds to a frequency, expressed in GHz, of signals transmitted over wires within the MLC package. The NEXT vs. frequency plots of FIG. 8 are obtained from simulations performed by a frequency-domain 3-D electromagnetic field solver program.

The 9 neighboring signal wires S1-S9, arranged as depicted in FIG. 2, are used as a basis for electromagnetic models employed in the calculation of NEXT and FEXT. NEXT and FEXT between the victim signal wire S5 and the nearby aggressor signal wires S1-S4 and S6-S9, can be computed using the frequency-domain 3-D electromagnetic field solver program. Electromagnetic simulation models for this field solver program are based on physical characteristics, e.g., geometric feature arrangements and dimensions such as those depicted in FIGS. 2, 3, 6 and 11. For example, a width, a length, and a thickness of signal wires S1-S9 as well as dimensions of wires, e.g., 252 and 254, FIG. 2, of adjacent mesh planes, can be used for simulation modeling purposes.

FIG. 8 depicts an increase 836 of NEXT of approximately 2 dB across portions of the frequency range of 0-40 GHz, resulting from the use of modulated mesh planes within an MLC package design. A NEXT increase of this magnitude may result in a marginal decrease of operating frequencies and reliability of data transmitted through an MLC electronic package. Although the use of modulated mesh planes can reduce FEXT by 4 dB, NEXT can be increased by 2 dB, thus partially offsetting an improvement in signal quality. Additional techniques, such as adding via interconnect structures and alternating length rods to modulated mesh structures, may be used to resolve the issue of increased NEXT resulting from mesh modulation. Such techniques may also be useful in further reducing FEXT.

Figure 9:
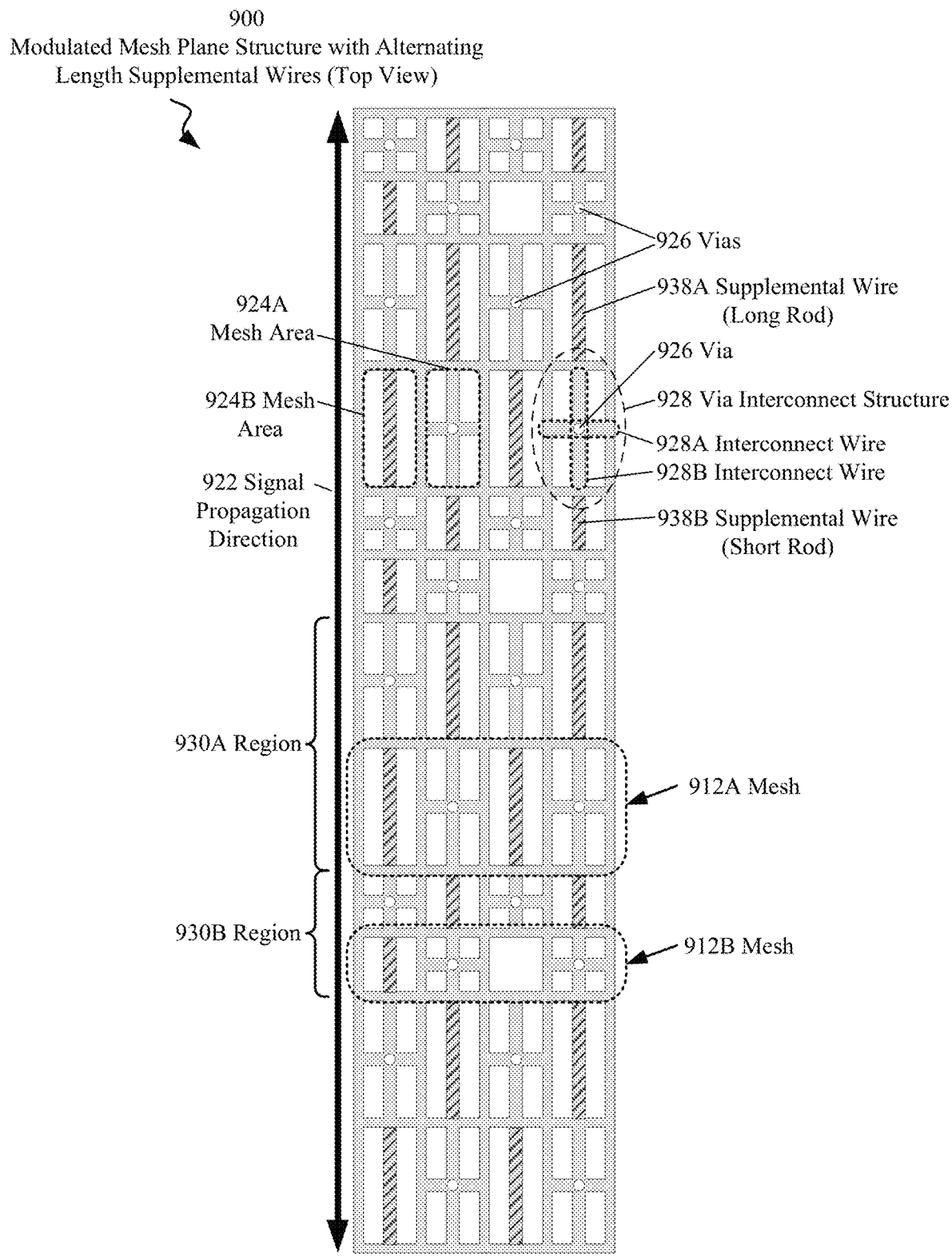
FIG. 9 depicts a top view of a modulated mesh plane structure with alternating length rods, according to embodiments consistent with the figures.

FIG. 9 depicts a top view of a modulated mesh plane structure with alternating length supplemental wires 900, according to embodiments consistent with the figures, particularly FIGS. 1, 2 and 5. FIG. 9 can be useful in depicting a reference plane, e.g., a GND or voltage plane having meshes with modulated, alternating width openings in the signal propagation direction 922. FIG. 9 also depicts a set of alternating length supplemental wires or "rods," located within alternating mesh areas of modulated mesh plane structure with alternating length supplemental wires 900.

Modulated mesh plane structure with alternating length supplemental wires 900 includes regions 930A and 930B, generally consistent with regions 530A and 530B, FIG. 5. Regions 930A and 930B include instances of meshes 912A and 912B, respectively. According to embodiments, instances of mesh 912A and mesh 912B each include an alternating pattern of instances of mesh areas populated with a supplemental wire, and mesh areas populated with a via interconnect structure. For example, mesh 912A includes an alternating pattern of instances of mesh areas 924B populated with a supplemental wire 938A and mesh areas 924A that are populated with via interconnect structures 928 and vias 926. Mesh areas 924A and 924B each have a rectangular perimeter formed by portions of two adjacent wires oriented parallel to signal propagation direction 922 and two adjacent wires oriented orthogonally to signal propagation direction 922. Mesh 912B includes a similar alternating pattern of instances of mesh areas populated with supplemental wires and mesh areas populated with via interconnect structures. According to embodiments, supplemental wires are oriented parallel to signal propagation direction 922.

In some embodiments, the set of supplemental wires, including 938A and 938B, and the set of via interconnect structures 928 are arranged in a pattern that alternates along both the signal propagation direction 922 and along a direction orthogonal to the signal propagation direction 922. In some embodiments the supplemental wires 938A located within the region 930A of the upper and lower mesh planes can be longer than the supplemental wires 938B located within the region 930B of the upper and lower mesh planes.

In some embodiments, a width of a supplemental wire can be approximately the width of ground mesh line, and in some embodiments, the width of the supplemental wire can vary from the width of ground mesh line. Design and manufacturing constraints related to manufacturability and acceptable crosstalk within an MLC package may be used to determine a width of the supplemental wire.

Each via interconnect structure, e.g., 928, includes interconnect wires, e.g., 928A that electrically interconnect the two adjacent wires oriented parallel to signal propagation direction 922 to a corresponding via 926. Each via interconnect structure also includes interconnect wires, e.g., 928B, that electrically interconnect the two adjacent wires oriented orthogonally to signal propagation direction 922 to the corresponding via 926.

Upper and lower via interconnect structures 928 can be located within upper and lower mesh planes, respectively. According to embodiments, the upper and lower mesh planes, respectively, can be respectively positioned above and below a wiring plane of an MLC package. Upper and lower mesh planes can be interconnected by vias, e.g., 926, to provide shielding, reduced crosstalk, and controlled impedance to signal wires located within the wiring plane. The depiction of via interconnect structures 928 in FIG. 9 is not to be construed as limiting in any way; according to embodiments, via interconnect structures can include a single or multiple interconnect wires, e.g., 928A and 928B, arranged in a variety of configurations.

According to embodiments, the modulated mesh plane structure with alternating length supplemental wires depicted in FIG. 9 can be particularly useful for reducing NEXT as well as to provide further reduction in FEXT, relative to the modulated mesh plane structure depicted in FIGS. 5 and 6.

In embodiments, the supplemental wires or rods can be useful in blocking both electric fields and magnetic fields, which can reduce both capacitive coupling and mutual inductive coupling, respectively. The reduction of both capacitive and mutual inductive coupling can result in reduction of crosstalk between neighboring signal lines.

According to embodiments, via interconnect structures, e.g., 928, and associated inter-plane vias, e.g., 926, in conjunction with supplemental wires, e.g., 938A and 938B can be used to shorten and re-route adjacent signal and return current paths. This return current path shortening can result in the reduction of effective capacitive and inductive coupling between victim nets and nearby aggressor nets. Reducing both the capacitive and inductive coupling between adjacent nets can be particularly effective in providing reduced NEXT and FEXT for signal nets within the MLC package.

Figure 10:
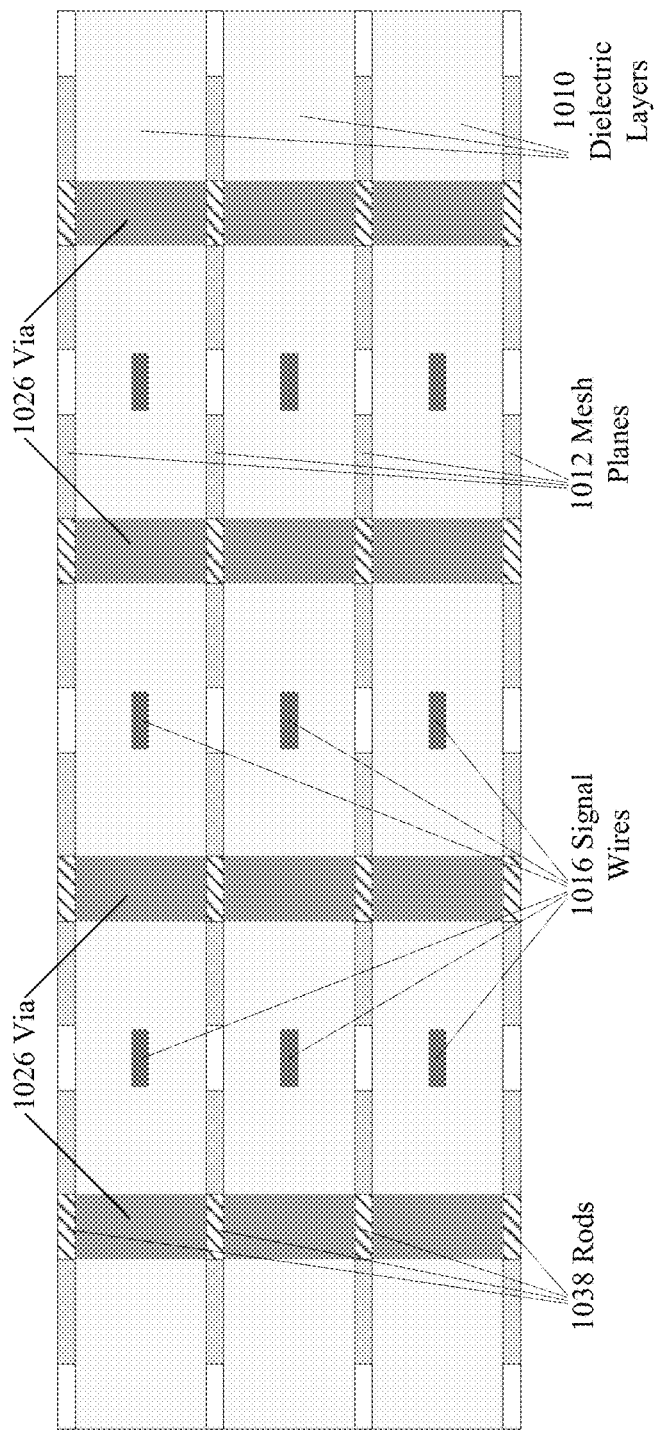
FIG. 10 depicts an end view of an MLC package with modulated mesh plane structure having alternating length rods, according to embodiments consistent with the figures.

FIG. 10 depicts an end view of a multilayer ceramic package with modulated mesh plane structure having alternating length rods 1000, according to embodiments consistent with the figures, particularly FIGS. 1 and 9. FIG. 10 can be particularly useful in depicting and providing a visual understanding of the positioning of rods 1038 with respect to the other elements, e.g., signal wires 1016, mesh planes 1012, dielectric layers 1010 and vias 1026 of an MLC package. It can be understood that the positioning of rods 1038 can make advantageous use of otherwise unused space within each mesh plane 1012 in order to provide supplemental shielding of electric and magnetic fields for signal wires 1016 within the MLC package. It can also be understood that, according to embodiments, alternating length supplemental wires or rods 1038 positioned within mesh planes 1012 are orientated in the same direction as signal wires 1016. Rods 1038 can be long rods or short rods, depending on a position where they are located within mesh planes 1012.

Figure 11:
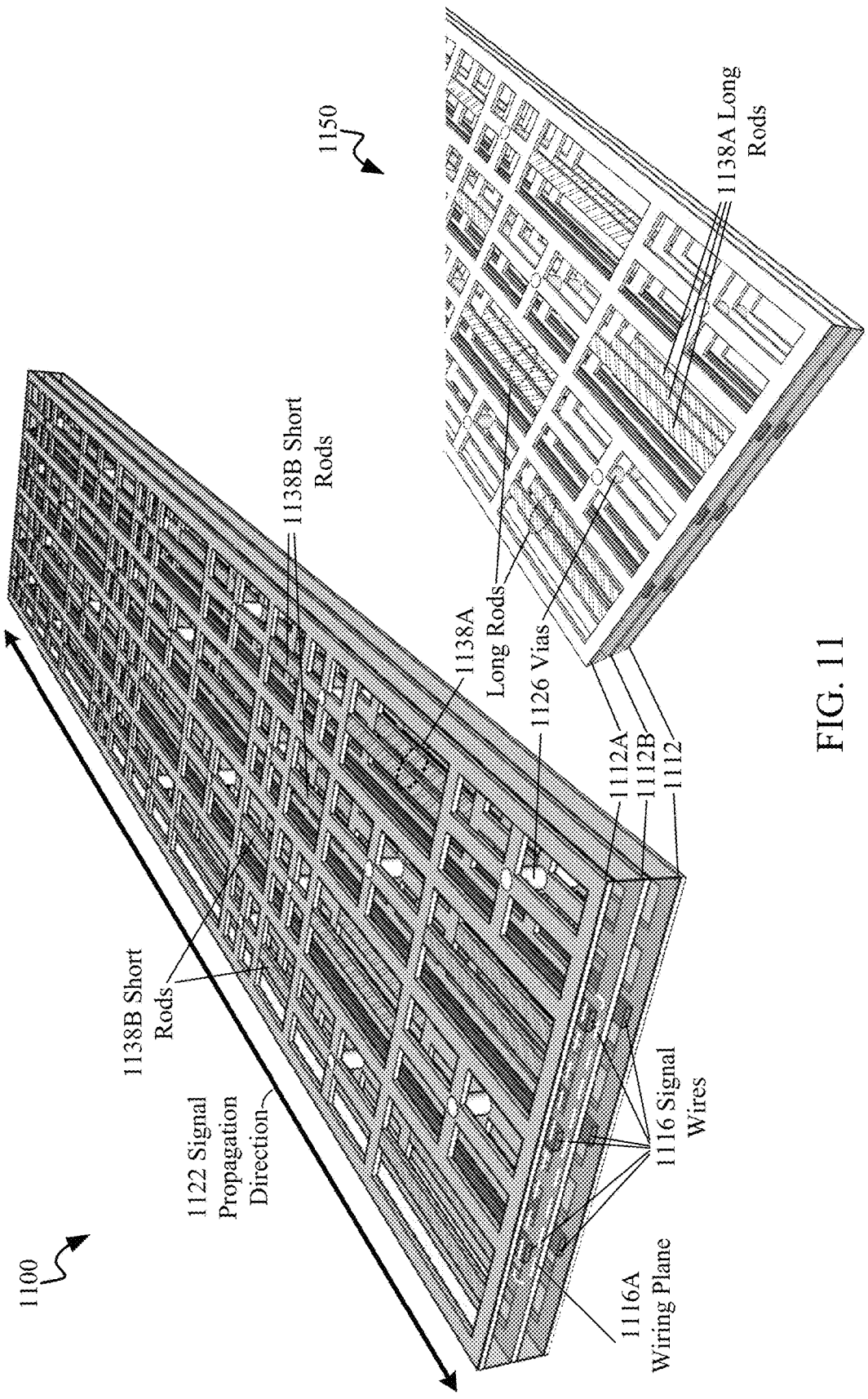
FIG. 11 includes two example isometric views of an MLC package with a modulated mesh plane structure having alternating length rods, according to embodiments consistent with the figures.

FIG. 11 includes two consistent isometric views, view 1100 and view 1150, each depicting an example of a multilayer ceramic package with a modulated mesh plane structure having alternating length rods, according to embodiments consistent with the figures, particularly FIGS. 9 and 10. FIG. 11 can be useful for representing area(s) of post-breakout wiring, consistent with post-breakout signal wire 116, FIG. 1, and with the views 200, 250 of FIG. 2.

FIG. 11 can provide a visual understanding and perspective of relative 3-D positions and orientations of various elements of the MLC package, according to embodiments. For example, FIG. 11 depicts wiring plane 1116A, signal wires 1116, mesh plane 1112, upper mesh plane 1112A, lower mesh plane 1112B, vias 1126 and supplemental wires 1138A, 1138B, consistent with respective elements depicted in and discussed with respect to FIGS. 9 and 10. Signal propagation direction 1122 is in a consistent direction, i.e., along the same axis, as the extension of signal wires 1116, consistent with FIG. 9. Features including mesh areas, meshes, regions, dielectric layers, vias, via interconnect structures and interconnect wires, consistent with those depicted and referenced in FIG. 9 are depicted, but not referenced, for clarity of illustration.

FIG. 11 depicts the interleaved arrangement of upper and lower mesh planes with a wiring plane, and the vertically stacked arrangement of upper and lower via interconnect structures located, respectively, on upper and lower stacked mesh planes. FIG. 11 is particularly useful in depicting the use of via interconnect structures in conjunction with vias to electrically interconnect mesh planes 1112, 1112A and 1112B. FIG. 11 is also particularly useful in depicting the use of rods or supplemental wires, e.g., long rods 1138A and short rods 1138B, to provide supplementary electrical interconnection within mesh planes 1112, 1112A and 1112B. FIG. 11, in particular, view 1150, depicts the vertically stacked configuration of long rods 1138A and short rods 1138B within an MLC package.

Figure 12:
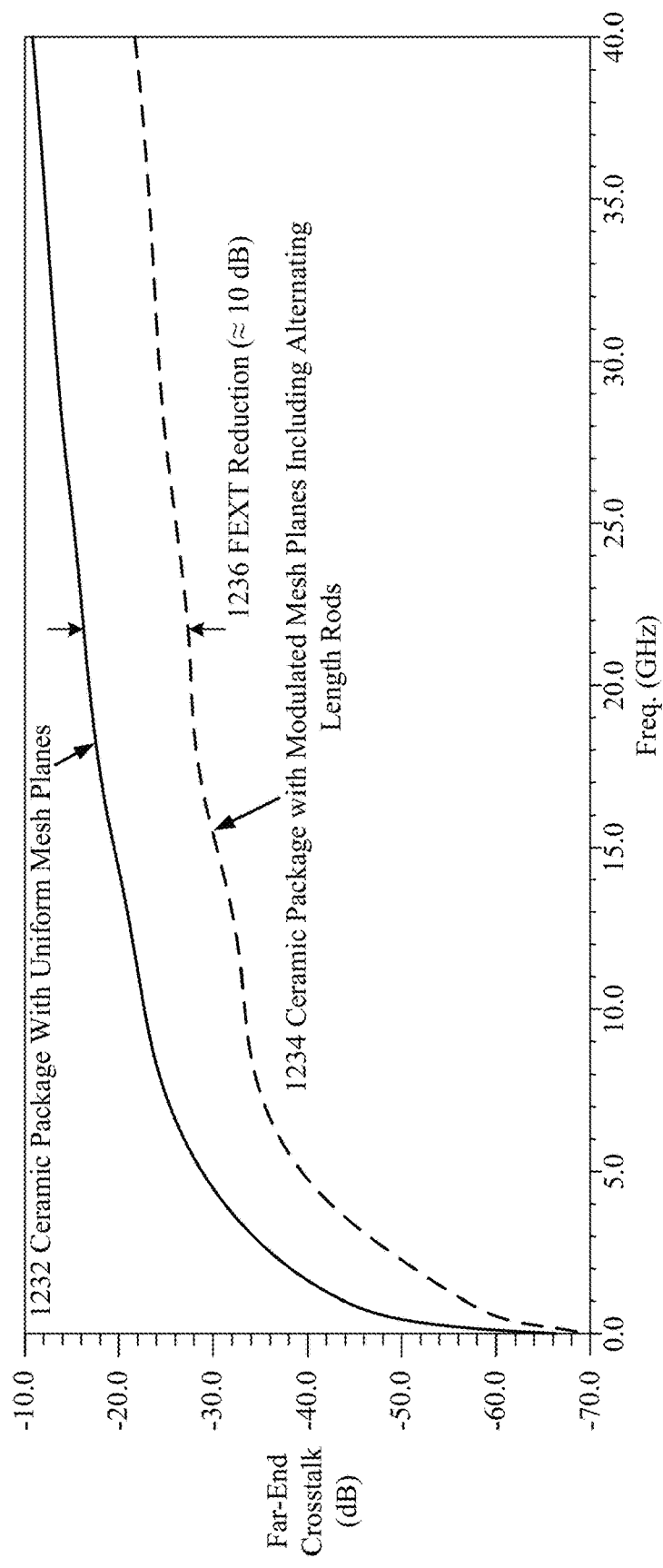
FIG. 12 is a graph depicting FEXT vs. frequency for a ceramic package with uniform mesh planes and for a ceramic package with modulated mesh planes and alternating length rods, according to embodiments consistent with the figures.

FIG. 12 is a graph including plots of FEXT vs. frequency for a ceramic package with uniform mesh planes and for a ceramic package with modulated mesh planes and alternating length rods, according to embodiments consistent with the figures, particularly FIGS. 3 and 11. The Y-axis of FIG. 12 corresponds to FEXT, expressed in decibels (dB), while the X-axis of FIG. 7 corresponds to a frequency, expressed in GHz, of signals transmitted over wires within the MLC package. The FEXT vs. frequency plots of FIG. 12 are obtained from simulations performed by a frequency-domain 3-D electromagnetic field solver program.

The 9 neighboring signal wires S1-S9, arranged as depicted in FIG. 2, are used as a basis for electromagnetic models employed in the calculation of NEXT and FEXT. NEXT and FEXT between the victim signal wire S5 and the nearby aggressor signal wires S1-S4 and S6-S9, can be computed using the frequency-domain 3-D electromagnetic field solver program. Electromagnetic simulation models for this field solver program are based on physical characteristics, e.g., geometric feature arrangements and dimensions such as those depicted in FIGS. 2, 3, 6 and 11. For example, a width, a length, and a thickness of signal wires S1-S9 as well as dimensions of wires, e.g., 252 and 254, FIG. 2, of adjacent mesh planes, can be used for simulation modeling purposes.

FIG. 12 depicts a significant reduction 1236 of FEXT of approximately 10 dB across the majority of the frequency range of 0-40 GHz, resulting from the use of modulated mesh planes and alternating length rods within an MLC package design. A FEXT reduction of this magnitude can be particularly useful for increasing operating frequencies and reliability of data transmitted through an MLC electronic package.

Figure 13:
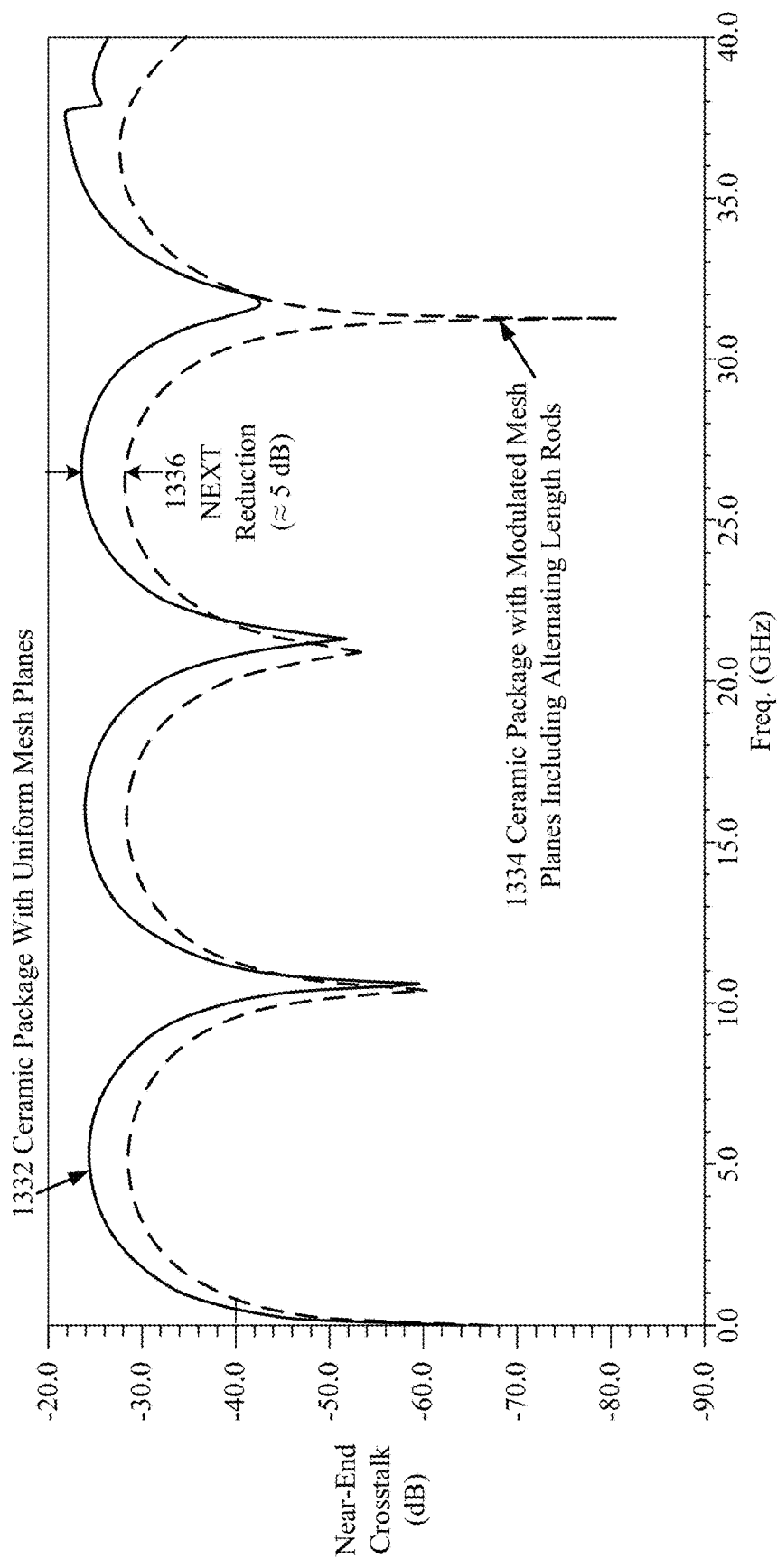
FIG. 13 is a graph depicting NEXT vs. frequency for a ceramic package with uniform mesh planes and for a ceramic package with modulated mesh planes and alternating length rods, according to embodiments consistent with the figures.

FIG. 13 is a graph including plots of NEXT vs. frequency for a ceramic package with uniform mesh planes and for a ceramic package with modulated mesh planes and alternating length rods, according to embodiments consistent with the figures, particularly FIGS. 3 and 11. The Y-axis of FIG. 13 corresponds to NEXT, expressed in decibels (dB), while the X-axis of FIG. 13 corresponds to a frequency, expressed in GHz, of signals transmitted over wires within the MLC package. The NEXT vs. frequency plots of FIG. 13 are obtained from simulations performed by a frequency-domain 3-D electromagnetic field solver program.

The 9 neighboring signal wires S1-S9, arranged as depicted in FIG. 2, are used as a basis for electromagnetic models employed in the calculation of NEXT and FEXT. NEXT and FEXT between the victim signal wire S5 and the nearby aggressor signal wires S1-S4 and S6-S9, can be computed using the frequency-domain 3-D electromagnetic field solver program. Electromagnetic simulation models for this field solver program are based on physical characteristics, e.g., geometric feature arrangements and dimensions such as those depicted in FIGS. 2, 3, 6 and 11. For example, a width, a length, and a thickness of signal wires S1-S9 as well as dimensions of wires, e.g., 252 and 254, FIG. 2, of adjacent mesh planes, can be used for simulation modeling purposes.

FIG. 13 depicts a significant reduction 1336 of NEXT of approximately 5 dB across the majority of the frequency range of 0-40 GHz, resulting from the use of modulated mesh planes and alternating length rods within an MLC package design. A NEXT reduction of this magnitude can be particularly useful for increasing operating frequencies and reliability of data transmitted through an MLC electronic package.

Figure 14:
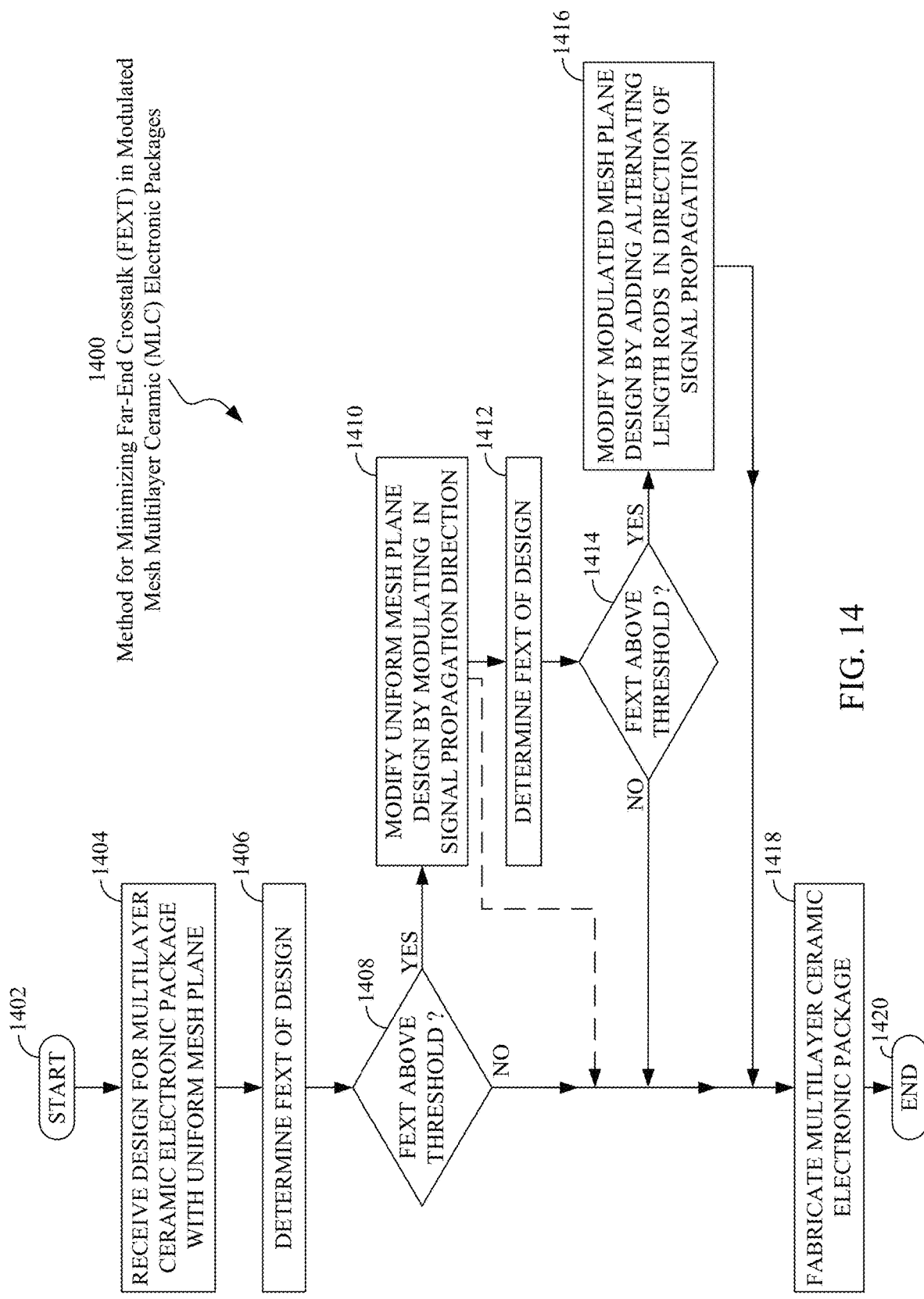
FIG. 14 is a flow diagram depicting a method for minimizing FEXT in modulated mesh MLC electronic packages, according to embodiments consistent with the figures.

FIG. 14 is a flow diagram depicting a computer-implemented method 1400 for minimizing FEXT in a modulated mesh MLC electronic package, according to embodiments consistent with the figures. FIG. 14 depicts operations for implementing design changes to an MLC modulated mesh structure in order to manage and reduce crosstalk experienced by signals transmitted through the MLC. The operations described herein in reference to the method 1400 generally correspond to FIGS. 4, 5 and 6, and their associated descriptions.

It can be understood that modern electronic package designs frequently include an extremely large number, e.g., thousands, of electrical interconnect structures such as wires, vias, and attachment pads. In embodiments, a correspondingly large number of mathematical and logical operations are performed on electronic package design data, as depicted in and described in reference to FIG. 14. These mathematical and logical operations can include calculations, estimations, identifications and modifications. It can be understood by one of skill in the art of electronic package design that the number of operations described in reference to FIG. 14, in the context of a modern electronic package design, is too large to be performed manually. These operations therefore must be completed by one or more EDA tools, in order for the design and fabrication of an MLC package according to embodiments to be practical.

The method 1400 moves from start 1402 to operation 1404. Operation 1404 generally refers to receiving an original MLC package design. According to embodiments, the original MLC package design can be received with an EDA program, for example, an electromagnetic field solver program. The original design may be contained in a design file that includes data such as coordinates for conductive shapes, e.g., as wires and meshes, coordinates of via locations, layer ordering, and material properties. According to embodiments, the design file may be created by an electronic packaging designer through the use of a layout editor program, which may be part of an EDA suite of tools. The data contained within the file is used to specify a uniform mesh design, i.e., a mesh design having uniform wire spacings in the direction of signal propagation in a post-breakout area of the mesh for the MLC package. In embodiments, the design file can contain data formatted in an industry-standard format. Once the original design for the MLC electronic package has been received, the method moves to operation 1406.

Operation 1406 generally refers to determining the FEXT of the original design. According to embodiments, the design file containing the original MLC package design is read by a frequency-domain 3-D electromagnetic field solver program. The field solver program also receives, as input, electromagnetic models and/or physical characteristics, e.g., geometric feature arrangements and dimensions such as those depicted in FIGS. 2, 3, 6 and 11, from which electromagnetic simulation models are subsequently created. The electromagnetic field solver program is then run according to parameters specified by an electronic package designer, for example, a frequency range and/or particular aggressor signal stimulus patterns. In embodiments, the output of the simulator program is one or more plot(s) of crosstalk values resulting from activity of adjacent signal lines, e.g., NEXT and/or FEXT, over the specified frequency range. Once the FEXT of the original design has been determined, the method moves to operation 1408.

At operation 1408 a determination is made regarding whether the FEXT of the original design is above a FEXT threshold. According to embodiments, such a determination can be made by an EDA analysis tool, according to a threshold specified by an electronic package designer. In some embodiments, a crosstalk threshold can be, for example, 16 dB. Maintaining such a crosstalk threshold between adjacent signal wires within an MLC package can ensure that coupled noise does not interfere with transmitted data signals and cause a loss of reliability of data transmission across the signal wires. According to embodiments, maintaining a crosstalk threshold of 16 dB can result in bit error rates less than $1.0\ E^{-12}$ per data lane within an MLC package.

The results of this determination are useful in deciding whether additional modifications are needed in order to bring the FEXT of the original design below a specified crosstalk threshold. Maintaining the FEXT below a specified threshold can be particularly useful for ensuring that an MLC package design can perform reliably, with an acceptable error rates, e.g., bit error rate (BER) over a specified data transmission frequency range. If the FEXT of the original design is above the FEXT threshold, the method moves to operation 1410. If the FEXT of the original design is not above the FEXT threshold, the method moves to operation 1418. Operation 1410 generally refers to modifying the original design to create a modified design. According to embodiments, the original MLC package design can be modified with an EDA program, for example, a layout editor program, or an automated layout generation program. The original MLC package design can be modified in response to the FEXT for the original design being above a crosstalk threshold, as determined in operations 1406 and 1408. A layout editor program can be used to alter mesh wires spacing along a direction of signal propagation within mesh planes of an MLC package design, consistent with the figures and associated discussion, particularly FIGS. 4, 5 and 6. Once the layout modifications are completed, data representing the modified design data is saved into a modified design file. According to embodiments, modulating mesh spacings of an original design having uniform mesh spacings can result in a reduction of FEXT between adjacent signal lines of at least 4 dB. (See FIG. 7.) In some embodiments of the present disclosure, once the original design has been modified, the method moves to operation 1412. In some embodiments of the present disclosure, once the original design has been modified, the method moves to operation 1418.

Operation 1412 generally refers to determining the FEXT of the modified design. According to embodiments, the design file containing the modified MLC package design, created in operation 1410, is read by a frequency-domain 3-D electromagnetic field solver program. The field solver program also receives, as input, electromagnetic models and/or physical characteristics, e.g., geometric feature arrangements and dimensions such as those depicted in FIGS. 2, 3, 6 and 11, from which electromagnetic simulation models are subsequently created. The electromagnetic field solver program is then run according to parameters specified by an electronic package designer, for example, a frequency range and/or particular aggressor signal stimulus patterns. In embodiments, the output of the simulator program is one or more plot(s) of crosstalk values resulting from activity of adjacent signal lines, e.g., NEXT and/or FEXT, over the specified frequency range. Once the FEXT of the modified design has been determined, the method moves to operation 1414.

At operation 1414 a determination is made regarding whether the FEXT of the modified design is above a FEXT threshold. According to embodiments, such a determination can be made by an EDA analysis tool, according to a threshold specified by an electronic package designer. In some embodiments, a crosstalk threshold can be, for example, 16 dB. Maintaining such a crosstalk threshold between adjacent signal wires within an MLC package can ensure that coupled noise does not interfere with transmitted data signals and cause a loss of reliability of data transmission across the signal wires. According to embodiments, maintaining a crosstalk threshold of 16 dB can result in bit error rates less than $1.0\ E^{-12}$ per data lane within an MLC package. The results of this determination are useful in deciding whether additional modifications are needed in order to bring the FEXT of the original design below a specified crosstalk threshold. Maintaining the FEXT below a specified threshold can be particularly useful for ensuring that an MLC package design can perform reliably, with an acceptable error rates, e.g., BER, over a specified data transmission frequency range. If the FEXT of the modified design is above the FEXT threshold, the method moves to operation 1416. If the FEXT of the modified design is not above the FEXT threshold, the method moves to operation 1418.

Operation 1416 generally refers to modifying the modified design to create a final design. According to embodiments, the modified MLC package design can be further modified with the EDA program, for example, a layout editor program, or an automated layout generation program. The modified MLC package design can be further modified in response to the FEXT for the modified design being above a crosstalk threshold, as determined in operations 1412 and 1414. A layout editor program or an automated layout generation program can be used add alternating length supplemental wires or "rods" along a direction of signal propagation within mesh planes of an MLC package design, consistent with the figures and associated discussion, particularly FIGS. 9, 10 and 11. Via interconnection structures and vias can similarly be added to the mesh planes of an MLC package design. Further details of how operation 1416 can be performed, according to embodiments, are depicted and described in reference to FIG. 15. Once the layout modifications are completed, data representing the modified design data is saved into a modified design file. According to embodiments, adding alternating length supplemental wires, via interconnection structures and vias to a modified design having modulated mesh spacings can result in a reduction of FEXT of at least 10 dB between adjacent signal lines. (See FIG. 12.) A corresponding reduction of NEXT of at least 5 dB between adjacent signal lines may also be realized as a result of the above-described mesh design modifications. (See FIG. 13.) Once the modified design has been modified to create a final design, the method moves to operation 1418.

Operation 1418 generally refers to fabricating the MLC electronic package in accordance with one of the modified design and the final design. According to embodiments, either the modified design or the final design, produced from operations 1410 and 1416, respectively, and contained within a modified design file or a final design file, respectively, is transferred or transmitted to an electronic package manufacturing facility. The design file contains data such as coordinates for conductive shapes, e.g., as wires and meshes, coordinates of via locations, layer ordering, and material properties. An electronic package manufacturing process can subsequently use this data to fabricate an MLC package. Such manufacturing process operations can include forming electrical conductors on surfaces of ceramic greensheet layers, forming vias within the greensheet layers, aligning and assembling the greensheet layers in a stack, and pressing and sintering the greensheet layers in a high temperature oven. Some embodiments may also include one or more MLC package testing operations directed towards conductivity, crosstalk, and/or signal integrity measurements/verification. Once the MLC electronic package has been fabricated, the method 1400 may end at block 1420.

Figure 15:
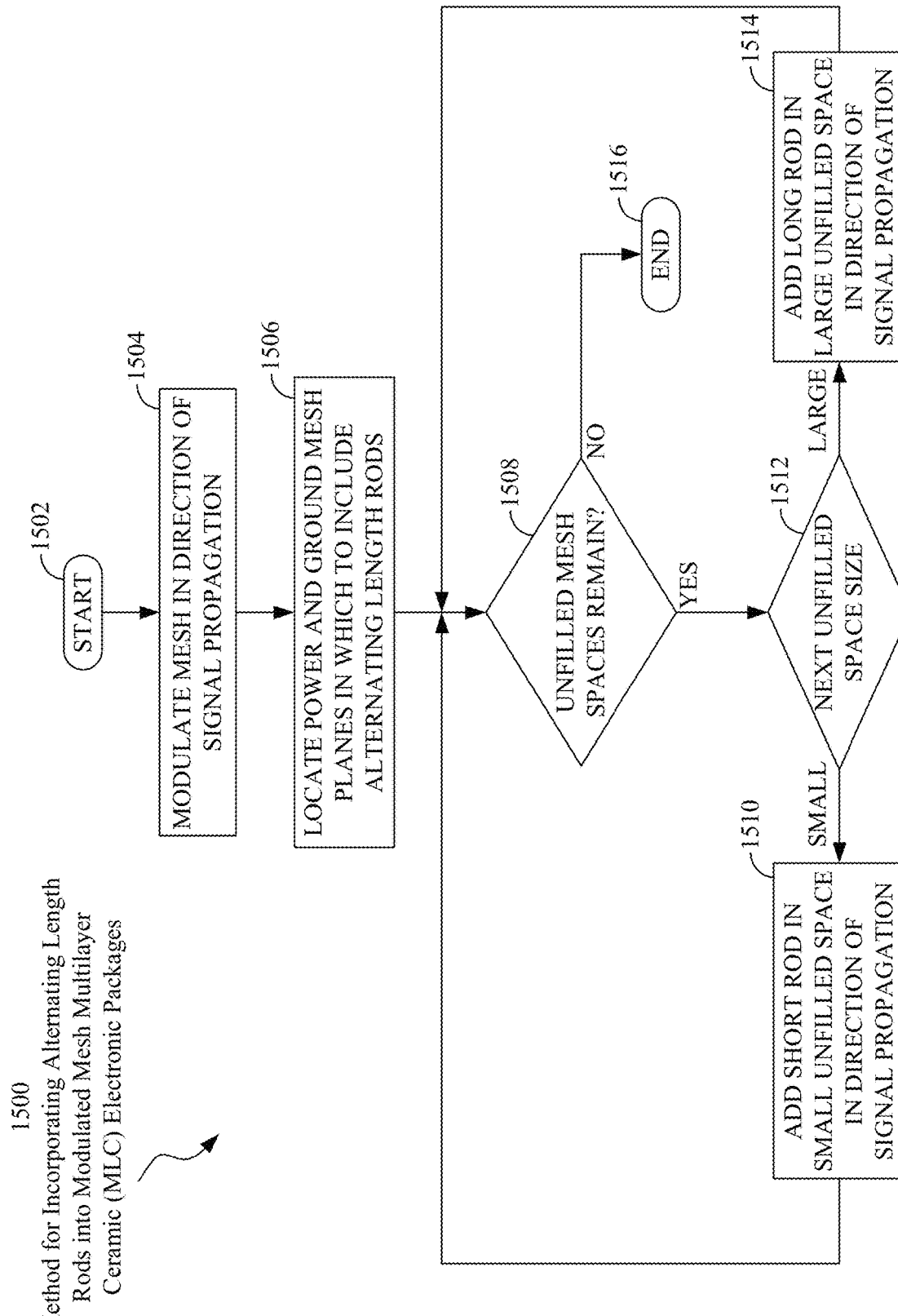
FIG. 15 is a flow diagram depicting a method for incorporating alternating length rods into modulated mesh MLC electronic packages, according to embodiments consistent with the figures.

FIG. 15 is a flow diagram depicting a computer-implemented method 1500 for incorporating alternating length rods into modulated mesh MLC electronic packages 1500, according to embodiments consistent with the figures. It can be understood that the operations described in reference to the method 1500 of FIG. 15 are directly related to FIG. 14, operation 1416, which relates to the process of adding supplemental wires to a modulated mesh of an MLC package.

FIG. 15 depicts operations for implementing design changes to an MLC modulated mesh structure in order to manage and reduce crosstalk experienced by signals transmitted through the MLC. The operations described herein in reference to the method 1500 generally correspond to FIGS. 9 and 14, and their associated descriptions.

It can be understood that modern electronic package designs frequently include an extremely large number, e.g., thousands, of electrical interconnect structures such as wires, vias, and attachment pads. In embodiments, a correspondingly large number of mathematical, logical, and data manipulation operations are performed on electronic package design data, as depicted in and described in reference to FIG. 15. These mathematical, logical, and data manipulation operations can include calculations, estimations, identifications and modifications. It can be understood by one of skill in the art of electronic package design that the number of operations described in reference to FIG. 15, in the context of a modern electronic package design, is too large to be performed manually. These operations therefore must be completed by one or more EDA tools, in order for the design and fabrication of an MLC package according to embodiments to be practical.

The method 1500 moves from start 1502 to operation 1504. Operation 1504 generally refers to modulating a mesh of an MLC package in a direction of signal propagation. According to embodiments, an original MLC package design can be modified with an EDA program, for example, a layout editor program, or an automated layout generation program. The motivation for modifying the original MLC package design can be that FEXT for the original design was determined to be above a crosstalk threshold. See operations 1406, 1408, FIG. 14. A layout editor program can be used to alter mesh wires spacing along a direction of signal propagation within mesh planes of an MLC package design, consistent with the figures and associated discussion, particularly FIGS. 4, 5 and 6. Once the layout modifications are completed, data representing the modified design data is saved into a modified design file. Once the mesh of the MLC package has been modulated in the direction of signal propagation, the method moves to operation 1506.

Operation 1506 generally refers to locating power and ground mesh planes in which to include alternating length rods. According to embodiments, an EDA program such as a layout analysis program can be used to scan and parse through design data contained in a design data file. Such design data can include, for example, locations of wires and other shapes within a mesh plane of an MLC design, and the location of mesh planes with the layer stack of the MLC design. In embodiments, the result of the EDA program scanning and parsing through design data can include a list of locations of meshes, e.g., supply voltage and GND meshes, into which alternating length rods can be inserted. Once the power and ground mesh planes have been located, the method moves to operation 1508.

At operation 1508 a determination is made regarding whether any spaces within meshes of the MLC design remain unfilled with supplemental wires/rods. According to embodiments, a layout analysis/modification program can be used to scan and parse through design data contained in a design data file. In embodiments, the result of the layout analysis/modification program scanning and parsing through design data can include a list of locations of spaces within meshes of the MLC design that remain unfilled, into which alternating length rods can be inserted. According to embodiments, an unfilled space within a mesh can include a space without a supplemental wire, via, or via interconnect structure. Alternatively, the layout analysis/modification program can also indicate if no unfilled mesh spaces remain within the meshes. Within the context of the present discussion, mesh spaces have been limited to "large" and "small" sizes, consistent with the figures herein. However, in some embodiments, any number of sizes of mesh spaces other than 2 can be used. The number of discrete mesh space sizes may depend on such factors as electromagnetic field-solver simulation results and electronic package designer preferences. If no unfilled mesh spaces remain, the method 1500 may end at block 1516. If unfilled mesh spaces remain, the method 1500 moves to operation 1512.

At operation 1512 a determination is made regarding a size of the next unfilled mesh space. According to embodiments, the layout analysis/modification program can be used to scan and parse through the list of locations of spaces within meshes of the MLC design generated in operation 1508. In embodiments, the list of locations of spaces within meshes can also include a corresponding list of sizes of the remaining open spaces, into which alternating length rods can be inserted. According to embodiments, this list of sizes can be parsed one at a time, to determine a size of a next unfilled mesh space in the list. Such a size value can be compared to a size criteria to determine if the size is "small" or "large," i.e., which size of two possible size options available. If the next unfilled mesh space size is large, the method moves to operation 1514. If the next unfilled mesh space size is small, the method moves to operation 1510.

Operation 1514 generally refers to adding a long supplemental wire/rod to a large unfilled space within a mesh of the MLC design. According to embodiments, the layout analysis program can be used to locate the next unfilled large space size of the mesh and modify the mesh layout by inserting a long supplemental wire/rod into the open space, in a direction parallel to the direction of signal propagation of the mesh area. Once the a long supplemental wire has been added to the mesh, the method returns to operation 1508.

Operation 1510 generally refers to adding a short supplemental wire/rod to a large unfilled space within a mesh of the MLC design. According to embodiments, the layout analysis program can be used to locate the next unfilled large space size of the mesh and modify the mesh layout by inserting a short supplemental wire/rod into the open space, in a direction parallel to the direction of signal propagation of the mesh area. Once the short supplemental wire has been added to the mesh, the method returns to operation 1508.

Figure 16:
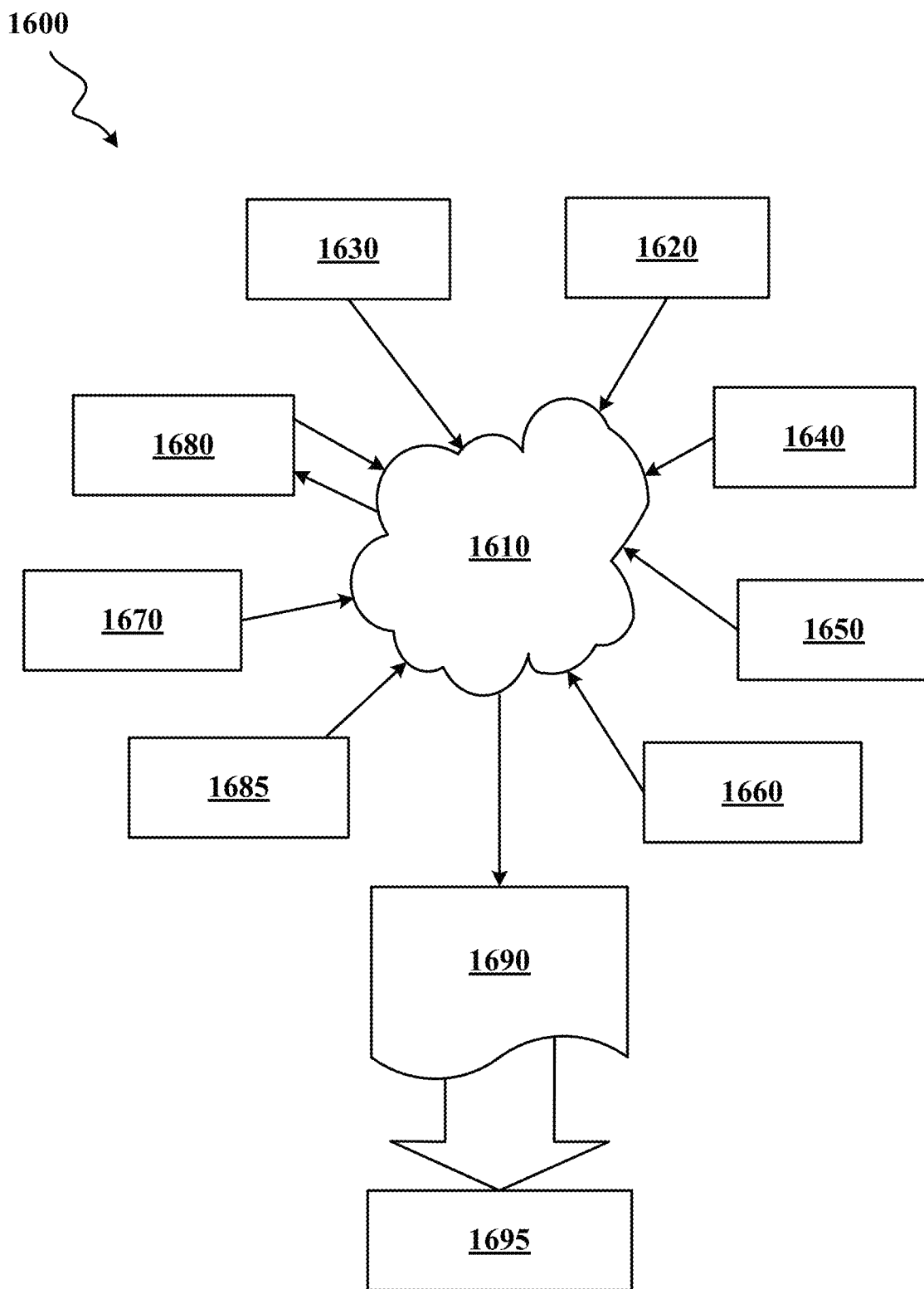
FIG. 16 illustrates multiple design structures including an input design structure that is preferably processed by a design process, according to embodiments consistent with the figures.

FIG. 16 depicts multiple design structures 1600 including an input design structure 1620 that is preferably processed by a design process, according to embodiments consistent with the figures. Input design structure 1620 may be a logical simulation design structure generated and processed by design process 1610 to produce a logically equivalent functional representation of a hardware device. Input design structure 1620 may alternatively include data or program instructions that, when processed by design process 1610, generate a functional representation of the physical structure of a hardware device. Whether representing functional or structural design features, input design structure 1620 may be generated using electronic computer-aided design, such as that implemented by a core developer/designer. When encoded on a machine-readable or computer-readable data transmission, gate array, or storage medium, input design structure 1620 may be accessed and processed by one or more hardware or software modules within design process 1610 to simulate or otherwise functionally represent an electronic component, circuit, electronic package, electronic or logic module, apparatus, device, or system such as those depicted in FIGS. 1-6 and FIGS. 9-11, or a circuit or electronic package personalized or modified by the methods described in reference to FIG. 14 and FIG. 15. As such, input design structure 1620 may include files or other data structures including human or machine-readable source code, compiled structures, and computer-executable code structures that, when processed by a design or simulation data processing system, functionally simulate or otherwise represent circuits, electronic packages, or other levels of hardware logic design. Such data structures may include hardware-description language design entities or other data structures conforming to or compatible with lower-level HDL design languages such as Verilog and VHDL, or higher level design languages such as C or C++.

Design process 1610 preferably employs and incorporates hardware or software modules for synthesizing, translating, or otherwise processing a design/simulation functional equivalent of the components, circuits, electronic package, devices, or logic structures depicted in FIGS. 1-6 and FIGS. 9-11, or a circuit or electronic package, personalized or modified by the methods described in reference to FIG. 14 and FIG. 15, to generate a Netlist 1660 which may contain design structures such as input design structure 1620. Netlist 1660 may comprise, for example, compiled or otherwise processed data structures representing a list of wires, discrete components, logic gates, control circuits, I/O devices, models, etc. that describe the connections to other elements and circuits in an integrated circuit or electronic package design. Netlist 1660 may be synthesized using an iterative process in which Netlist 1660 is resynthesized one or more times depending on design specifications and parameters for the device. As with other design structure types described herein, Netlist 1660 may be recorded on a machine-readable data storage medium or programmed into a programmable gate array. The medium may be a non-volatile storage medium such as a magnetic or optical disk drive, a programmable gate array, a compact flash, or other flash memory. Additionally, the medium may be a system or cache memory, buffer space, or electrically or optically conductive devices and materials on which data packets may be transmitted and intermediately stored via the internet, or other suitable networking means.

Design process 1610 may include hardware and software modules for processing a variety of input data structure types including Netlist 1660. Such data structure types may reside, for example, within library elements 1630 and include a set of commonly used elements, circuits, devices and wires, including models, layouts, and symbolic representations, for a given manufacturing technology (e.g., different technology nodes, 22 nm, 14 nm, 10 nm, 7 nm, etc.). The data structure types may further include design specifications 1640, characterization data 1650, verification data 1680, design rules 1670, and test data files 1685 which may include input test patterns, output test results, and other testing information. Design process 1610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1610, without deviating from the scope and spirit of the disclosure. Design process 1610 may also include modules for performing standard circuit and electronic package design processes such as timing analysis, verification, design rule checking, place and route operations, etc.

Design process 1610 employs and incorporates logic and physical design tools such as HDL compilers and simulation model build tools to process input design structure 1620 together with some or all of the depicted supporting data structures, along with any additional mechanical design or data, to generate a second design structure 1690. Second design structure 1690 resides on a storage medium or programmable gate array in a data format used for the exchange of data of mechanical devices and structures (e.g., information stored on an IGES, DXF, Parasolid XT, JT, DRG, or any other suitable format for storing or rendering such mechanical design structures). Similar to input design structure 1620, second design structure 1690 preferably comprises one or more files, data structures, or other computer-encoded data or instructions that reside on transmission or data storage media and that, when processed by an ECAD system, generate a logically or otherwise functionally equivalent form of one or more of the embodiments of the disclosure depicted in FIGS. 1-6 and FIGS. 9-11, or a circuit or electronic package personalized or modified by the methods described in reference to FIG. 14 and FIG. 15. In one embodiment, second design structure 1690 may comprise a compiled, executable HDL simulation model that functionally simulates the devices depicted in FIGS. 1-6 and FIGS. 9-11, or a circuit or electronic package personalized or modified by the methods described in reference to FIG. 14 and FIG. 15.

Second design structure 1690 may also employ a data format used for the exchange of layout data of integrated circuits or electronic packages and/or symbolic data format (e.g., information stored in a GDSII, GL1, OASIS, map files, or any other suitable format for storing such design data structures). Second design structure 1690 may comprise information such as symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and depicted in FIGS. 1-6 and FIGS. 9-11, or a circuit or electronic package personalized or modified by the methods described in reference to FIG. 14 and FIG. 15. Second design structure 1690 may then proceed to a state 1695 where, for example, second design structure 1690 proceeds to tape-out, is released to manufacturing, is released to a mask house, is sent to another design house, is sent back to the customer, etc.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. An electronic package including modulated mesh planes for reducing crosstalk between adjacent signal wires within the electronic package, the electronic package comprising:
    a wiring plane located in a coplanar orientation between an upper mesh plane and a lower mesh plane, the wiring plane including a set of adjacent signal wires, each signal wire of the set of adjacent signal wires extending parallel to a first axis and electrically insulated by a dielectric layer;
    the upper mesh plane that includes:
        a first set of wires, each wire of the first set of wires extending parallel to the first axis; and
        a second set of wires, each wire of the second set of wires:
            extending parallel to a second axis that is orthogonal to the first axis;
            intersecting with and electrically interconnected to the first set of wires; and
            electrically insulated from the wiring plane by a dielectric layer; and
    the lower mesh plane that includes:
        a third set of wires, each wire of the third set of wires extending parallel to the first axis; and
        a fourth set of wires, each wire of the fourth set of wires:
            extending parallel to the second axis;
            intersecting with and electrically interconnected to the third set of wires; and
            electrically insulated from the wiring plane by a dielectric layer; and
    a first region of the upper and lower mesh planes, wherein adjacent wires of the second set of wires are separated by a first distance and corresponding adjacent wires of the fourth set of wires are separated by the first distance; and
    a second region of the upper and lower mesh planes, wherein adjacent wires of the second set of wires are separated by a second distance that is greater than the first distance and corresponding adjacent wires of the fourth set of wires are separated by the second distance.

2. The electronic package of claim 1, further comprising:
    a via located in a mesh area having a rectangular perimeter that includes portions of two adjacent wires of the first set of wires that intersect with portions of two adjacent wires of the second set of wires;
    an upper via interconnect structure configured to electrically interconnect the via to the upper mesh plane; and
    a lower via interconnect structure configured to electrically interconnect the via to the lower mesh plane.

3. The electronic package of claim 2, wherein the upper via interconnect structure includes a first interconnect wire that electrically interconnects the two adjacent wires of the first set of wires to the via and that further includes a second interconnect wire that electrically interconnects the two adjacent wires of the second set of wires to the via.

4. The electronic package of claim 1, wherein the dielectric layer includes a glass-ceramic material.

5. The electronic package of claim 1, wherein the electronic package is selected from the group consisting of: a single-chip module (SCM), and a multi-chip module (MCM).

6. The electronic package of claim 1, wherein a width of the signal wires is less than 60 μm.

7. The electronic package of claim 1, wherein a thickness of the signal wires is less than 15 μm.

8. The electronic package of claim 1, wherein a ratio of the second distance to the first distance is in a range between 2 and 3.

9. An electronic system for reducing signal crosstalk between adjacent signal wires within an electronic package, the system comprising:
    the electronic package electrically and mechanically connected to a printed circuit board (PCB), the electronic package including:
        a wiring plane located in a coplanar orientation between an upper mesh plane and a lower mesh plane, the wiring plane including a set of adjacent signal wires, each signal wire of the set of adjacent signal wires extending parallel to a first axis and electrically insulated by a dielectric layer;
        the upper mesh plane that includes:
            a first set of wires, each wire of the first set of wires extending parallel to the first axis; and
            a second set of wires, each wire of the second set of wires:
                extending parallel to a second axis that is orthogonal to the first axis;
                intersecting with and electrically interconnected to the first set of wires; and
                electrically insulated from the wiring plane by a dielectric layer; and
        the lower mesh plane that includes:

a third set of wires, each wire of the third set of wires extending parallel to the first axis; and
a fourth set of wires, each wire of the fourth set of wires:
 extending parallel to the second axis;
 intersecting with and electrically interconnected to the third set of wires; and
 electrically insulated from the wiring plane by a dielectric layer; and
a first region of the upper and lower mesh planes, wherein adjacent wires of the second set of wires are separated by a first distance and corresponding adjacent wires of the fourth set of wires are separated by the first distance;
a second region of the upper and lower mesh planes, wherein adjacent wires of the second set of wires are separated by a second distance that is greater than the first distance and corresponding adjacent wires of the fourth set of wires are separated by the second distance; and
an integrated circuit (IC) electrically and mechanically connected to the electronic package; and
the PCB.

10. The electronic system of claim 9, further comprising:
a via located in a mesh area having a rectangular perimeter that includes portions of two adjacent wires of the first set of wires that intersect with portions of two adjacent wires of the second set of wires;
an upper via interconnect structure configured to electrically interconnect the via to the upper mesh plane; and
a lower via interconnect structure configured to electrically interconnect the via to the lower mesh plane.

11. The electronic system of claim 9, wherein the upper via interconnect structure includes a first interconnect wire that electrically interconnects two adjacent wires of the first set of wires to the via and that further includes a second interconnect wire that electrically interconnects the two adjacent wires of the second set of wires to the via.

12. The electronic system of claim 9, wherein the dielectric layer includes a glass-ceramic material.

13. The electronic system of claim 9, wherein the electronic package is selected from the group consisting of: a single-chip module (SCM), and a multi-chip module (MCM).

14. The electronic system of claim 9, wherein a width of the signal wires is less than 60 μm.

15. The electronic system of claim 9, wherein a thickness of the signal wires is less than 15 μm.

16. The electronic system of claim 9, wherein a ratio of the second distance to the first distance is in a range between 2 and 3.

17. The electronic system of claim 9, further comprising an additional IC electrically and mechanically connected to the electronic package.

18. A computer-implemented method for designing and fabricating a multilayer ceramic (MLC) electronic package having modulated mesh planes, the method comprising:
receiving, with an electronic design automation (EDA) program, a design for a multilayer ceramic electronic package having uniform mesh planes;
determining, with an electromagnetic structure simulation program, far-end crosstalk (FEXT) between adjacent signal wires within the design for the MLC electronic package;
modifying, with a layout editing program, in response to the FEXT for the design being above a crosstalk threshold, the design by modulating the uniform mesh planes in a direction parallel to the adjacent signal wires within the design to create a modified design having modulated mesh planes; and
fabricating, at a manufacturing facility, the MLC electronic package in accordance with the modified design, the modified design of the electronic package including modulated mesh planes.

19. The method of claim 18, wherein a difference between FEXT between adjacent signal wires within the design and FEXT between adjacent signal wires within the modified design is at least 4 dB.

20. The method of claim 18, wherein the crosstalk threshold is 16 dB.

* * * * *